US011461644B2

(12) United States Patent
Vahdat et al.

(10) Patent No.: US 11,461,644 B2
(45) Date of Patent: Oct. 4, 2022

(54) SYSTEMS AND METHODS FOR SEMANTIC SEGMENTATION

(71) Applicant: D-WAVE SYSTEMS INC., Burnaby (CA)

(72) Inventors: Arash Vahdat, Coquitlam (CA); Mostafa S. Ibrahim, Burnaby (CA); William G. Macready, West Vancouver (CA)

(73) Assignee: D-WAVE SYSTEMS INC., Burnaby (CA)

(*) Notice: Subject to any disclaimer, the term of this patent is extended or adjusted under 35 U.S.C. 154(b) by 499 days.

(21) Appl. No.: 16/682,976

(22) Filed: Nov. 13, 2019

(65) Prior Publication Data

US 2020/0160175 A1 May 21, 2020

Related U.S. Application Data

(60) Provisional application No. 62/768,020, filed on Nov. 15, 2018.

(51) Int. Cl.
*G06N 3/00* (2006.01)
*G06N 3/08* (2006.01)
*G06N 3/04* (2006.01)

(52) U.S. Cl.
CPC ............ *G06N 3/08* (2013.01); *G06N 3/0454* (2013.01)

(58) Field of Classification Search
None
See application file for complete search history.

(56) References Cited

U.S. PATENT DOCUMENTS

| 5,249,122 A | 9/1993 | Stritzke |
| 6,671,661 B1 | 12/2003 | Bishop |
| 7,135,701 B2 | 11/2006 | Amin et al. |

(Continued)

FOREIGN PATENT DOCUMENTS

| CN | 101473346 A | 7/2009 |
| CN | 101657827 A | 2/2010 |

(Continued)

OTHER PUBLICATIONS

Awasthi et al., "Efficient Learning of Linear Separators under Bounded Noise" Mar. 12, 2015, arXiv: 1503.03594v1, pp. 1-23. (Year: 2015).

(Continued)

*Primary Examiner* — Martin Mushambo
(74) *Attorney, Agent, or Firm* — Cozen O'Connor

(57) ABSTRACT

Fully-supervised semantic segmentation machine learning models are augmented by ancillary machine learning models which generate high-detail predictions from low-detail, weakly-supervised data. The combined model can be trained over both fully- and weakly-supervised data. Only the primary model is required for inference, post-training. The combined model can be made self-correcting during training by adjusting the ancillary model's output based on parameters learned over both the fully- and weakly-supervised data. The self-correction module may combine the output of the primary and ancillary models in various ways, including through linear combinations and via neural networks. The self-correction module and ancillary model may benefit from disclosed pre-training techniques.

20 Claims, 6 Drawing Sheets

(56) References Cited

U.S. PATENT DOCUMENTS

| | | | |
|---|---|---|---|
| 7,418,283 B2 | 8/2008 | Amin | |
| 7,493,252 B1 | 2/2009 | Nagano et al. | |
| 7,533,068 B2 | 5/2009 | Maassen et al. | |
| 7,876,248 B2 | 1/2011 | Berkley et al. | |
| 8,008,942 B2 | 8/2011 | Van et al. | |
| 8,035,540 B2 | 10/2011 | Berkley et al. | |
| 8,073,808 B2 | 12/2011 | Rose | |
| 8,190,548 B2 | 5/2012 | Choi | |
| 8,195,596 B2 | 6/2012 | Rose et al. | |
| 8,244,650 B2 | 8/2012 | Rose | |
| 8,340,439 B2 | 12/2012 | Mitarai et al. | |
| 8,421,053 B2 | 4/2013 | Bunyk et al. | |
| 8,863,044 B1 | 10/2014 | Casati et al. | |
| 9,378,733 B1 | 6/2016 | Vanhoucke et al. | |
| 9,727,824 B2 | 8/2017 | Rose et al. | |
| 10,296,846 B2 | 5/2019 | Csurka et al. | |
| 10,318,881 B2 | 6/2019 | Rose et al. | |
| 10,339,466 B1 | 7/2019 | Ding et al. | |
| 10,817,796 B2 | 10/2020 | Macready et al. | |
| 2002/0010691 A1 | 1/2002 | Chen | |
| 2003/0030575 A1 | 2/2003 | Frachtenberg et al. | |
| 2005/0119829 A1 | 6/2005 | Bishop et al. | |
| 2006/0041421 A1 | 2/2006 | Ta et al. | |
| 2006/0047477 A1 | 3/2006 | Bachrach | |
| 2006/0074870 A1 | 4/2006 | Brill et al. | |
| 2006/0115145 A1 | 6/2006 | Bishop et al. | |
| 2007/0011629 A1 | 1/2007 | Shacham et al. | |
| 2007/0162406 A1 | 7/2007 | Lanckriet | |
| 2008/0069438 A1 | 3/2008 | Winn et al. | |
| 2008/0103996 A1 | 5/2008 | Forman et al. | |
| 2008/0132281 A1 | 6/2008 | Kim et al. | |
| 2008/0176750 A1* | 7/2008 | Rose ............... | B82Y 10/00 505/170 |
| 2008/0215850 A1 | 9/2008 | Berkley et al. | |
| 2008/0312663 A1* | 12/2008 | Haimerl ............ | G06T 7/0012 128/898 |
| 2008/0313430 A1* | 12/2008 | Bunyk ............... | G06N 10/00 712/E9.082 |
| 2009/0077001 A1 | 3/2009 | Macready et al. | |
| 2009/0121215 A1 | 5/2009 | Choi | |
| 2009/0171956 A1 | 7/2009 | Gupta et al. | |
| 2009/0254505 A1 | 10/2009 | Davis et al. | |
| 2009/0278981 A1 | 11/2009 | Bruna et al. | |
| 2009/0322871 A1 | 12/2009 | Ji et al. | |
| 2010/0010657 A1 | 1/2010 | Do et al. | |
| 2010/0185422 A1 | 7/2010 | Hoversten | |
| 2010/0228694 A1 | 9/2010 | Le et al. | |
| 2010/0332423 A1 | 12/2010 | Kapoor et al. | |
| 2011/0022369 A1 | 1/2011 | Carroll et al. | |
| 2011/0022820 A1 | 1/2011 | Bunyk et al. | |
| 2011/0044524 A1 | 2/2011 | Wang et al. | |
| 2011/0047201 A1 | 2/2011 | Macready et al. | |
| 2011/0142335 A1 | 6/2011 | Ghanem et al. | |
| 2011/0231462 A1 | 9/2011 | Macready et al. | |
| 2011/0238378 A1 | 9/2011 | Allen et al. | |
| 2011/0295845 A1 | 12/2011 | Gao et al. | |
| 2012/0084235 A1 | 4/2012 | Suzuki et al. | |
| 2012/0124432 A1 | 5/2012 | Pesetski et al. | |
| 2012/0149581 A1 | 6/2012 | Fang | |
| 2012/0215821 A1 | 8/2012 | Macready et al. | |
| 2012/0254586 A1 | 10/2012 | Amin et al. | |
| 2013/0097103 A1 | 4/2013 | Chari et al. | |
| 2013/0236090 A1 | 9/2013 | Porikli et al. | |
| 2013/0245429 A1 | 9/2013 | Zhang et al. | |
| 2014/0025606 A1 | 1/2014 | Macready | |
| 2014/0040176 A1 | 2/2014 | Balakrishnan et al. | |
| 2014/0152849 A1 | 6/2014 | Bala et al. | |
| 2014/0187427 A1 | 7/2014 | Macready et al. | |
| 2014/0201208 A1 | 7/2014 | Satish et al. | |
| 2014/0214835 A1 | 7/2014 | Oehrle et al. | |
| 2014/0214836 A1 | 7/2014 | Stivoric et al. | |
| 2014/0297235 A1 | 10/2014 | Arora et al. | |
| 2015/0006443 A1 | 1/2015 | Rose et al. | |
| 2015/0161524 A1 | 6/2015 | Hamze | |
| 2015/0242463 A1 | 8/2015 | Lin et al. | |
| 2015/0248586 A1 | 9/2015 | Gaidon et al. | |
| 2015/0269124 A1 | 9/2015 | Hamze et al. | |
| 2015/0317558 A1 | 11/2015 | Adachi et al. | |
| 2016/0019459 A1 | 1/2016 | Audhkhasi et al. | |
| 2016/0042294 A1 | 2/2016 | Macready et al. | |
| 2016/0078600 A1 | 3/2016 | Perez Pellitero et al. | |
| 2016/0110657 A1 | 4/2016 | Gibiansky et al. | |
| 2016/0191627 A1 | 6/2016 | Huang et al. | |
| 2016/0307305 A1 | 10/2016 | Madabhushi et al. | |
| 2017/0132509 A1 | 5/2017 | Li et al. | |
| 2017/0255871 A1 | 9/2017 | Macready et al. | |
| 2017/0300817 A1 | 10/2017 | King et al. | |
| 2018/0018584 A1 | 1/2018 | Nock et al. | |
| 2018/0025291 A1 | 1/2018 | Dey et al. | |
| 2018/0137422 A1 | 5/2018 | Wiebe et al. | |
| 2018/0157923 A1 | 6/2018 | El Kaliouby et al. | |
| 2018/0165554 A1 | 6/2018 | Zhang et al. | |
| 2018/0165601 A1 | 6/2018 | Wiebe et al. | |
| 2019/0005402 A1 | 1/2019 | Mohseni et al. | |
| 2019/0018933 A1 | 1/2019 | Oono et al. | |
| 2019/0180147 A1* | 6/2019 | Zhang ............... | G06K 9/6262 |
| 2019/0258907 A1* | 8/2019 | Rezende ............ | G06N 3/084 |

FOREIGN PATENT DOCUMENTS

| | | |
|---|---|---|
| CN | 102364497 A | 2/2012 |
| CN | 102651073 A | 8/2012 |
| CN | 102831402 A | 12/2012 |
| CN | 102324047 B | 6/2013 |
| CN | 102364497 B | 6/2013 |
| CN | 104050509 A | 9/2014 |
| CN | 102037475 B | 5/2015 |
| CN | 104766167 A | 7/2015 |
| CN | 104919476 A | 9/2015 |
| CN | 106569601 A | 4/2017 |
| JP | 2011008631 A | 1/2011 |
| KR | 20130010181 A | 1/2013 |
| WO | 2009120638 A2 | 10/2009 |
| WO | 2010071997 A1 | 7/2010 |
| WO | 2015193531 A1 | 12/2015 |
| WO | 2016029172 A1 | 2/2016 |
| WO | 2016089711 A1 | 6/2016 |
| WO | 2016210018 A1 | 12/2016 |
| WO | 2017031356 A1 | 2/2017 |
| WO | 2017031357 A1 | 2/2017 |
| WO | 2017124299 A1 | 7/2017 |
| WO | 2017132545 A1 | 8/2017 |

OTHER PUBLICATIONS

Awasthi et al., "Learning and 1-bit Compressed Sensing under Asymmetric Noise" Jun. 6, 2016, JMLR, pp. 1-41. (Year 2016).

Bach et al., "On the Equivalence between Herding and Conditional Gradient Algorithms," Proceedings of the 29th International Conference on Machine Learning, 2012, 8 pages.

Bach, F. et al., "Optimization with Sparsity-Inducing Penalties," arXiv: 1108.0775v2 [cs.LG], Nov. 22, 2011, 116 pages.

Benedetti et al., "Quantum-assisted learning of graphical models with arbitrary pairwise connectivity" Sep. 8, 2016, arXiv: 1609.02542v1, pp. 1-13. (Year: 2016).

Berkley, A.J. et al., "Tunneling Spectroscopy Using a Probe Qubit," arXiv:1210.6310v2 [cond-mat.supr-con], Jan. 3, 2013, 5 pages.

Blanchard et al., "Classification with Asymmetric Label Noise: Consistency and Maximal Denoising" Aug. 5, 2016, arXiv: 1303.1208v3, pp. 1-47. (Year: 2016).

Bornschein et al., "Bidirectional Helmholtz Machines" May 25, 2016, arXiv: 1506.03877v5. (Year: 2016).

Brakel, P., Dieleman, S., & Schrauwen. "Training restricted Boltzmann machines with multi-tempering: Harnessing parallelization", 2012.

Chen et al., "Herding as a Learning System with Edge-of-Chaos Dynamics," arXiv: 1602.030142V2 [stat.ML], Mar. 1, 2016, 48 pages.

Chen et al., "Parametric Herding," Proceedings of the 13th International Conference on Artificial Intelligence and Statistics (AISTATS), 2010, pp. 97-104.

(56) References Cited

OTHER PUBLICATIONS

Chinese Office Action for Application No. CN 2016800606343, dated May 8, 2021, 21 pages (with English translation).
Courville, A. et al., "A Spike and Slab Restricted Boltzmann Machine," Proceedings of the 14th International Conference on Artificial Intelligence and Statistics (AISTATS), 2011, 9 pages.
Deng, J. et al., "ImageNet: A Large-Scale Hierarchical Image Database," Proceedings / CVPR, IEEE Computer Society Conference on Computer Vision and Pattern Recognition, 2009, 8 pages.
Desjardins, G., Courville, A., Bengio, Y., Vincent, P., & Delalleau, O. "Parallel tempering for training of restricted Boltzmann machines", 2010.
Dumoulin, V. et al., "On the Challenges of Physical Implementations of RBMs," Proceedings of the 28th AAAI Conference on Artificial Intelligence, vol. 2, Jul. 27, 2014, 7 pages.
Elkan, C., "Learning Classifiers from Only Positive and Unlabeled Data," KDD08: The 14th ACM SIGKDD International Conference on Knowledge Discovery and Data Mining Las Vegas Nevada USA Aug. 24-27, 2008, 8 pages.
Extended European Search Report for EP Application No. 16837862. 8,dated Apr. 3, 2019, 12 pages.
Fergus, R. et al., "Semi-Supervised Learning in Gigantic Image Collections," Advances in Neural Information Processing Systems, vol. 22, 2009, 8 pages.
First Office Action dated Nov. 29, 2021 in CN App No. 2016800731803. (English Translation).
First Office Action issued in Chinese No. 2018101287473 with English translation, dated Jul. 12, 2021, 16 pages.
Freidman, et al., "Learning Bayesian Networks from Data", Internet Movie Database, http://www.imdb.com, 19 pages.
Freund, Y. et al., "Large Margin Classification Using the Perceptron Algorithm," Machine Learning 37(3), 1999, 19 pages.
Fung, G. et al., "Parameter Free Bursty Events Detection in Text Streams," Proceedings of the 31st VLDB Conference, Trondheim, Norway, 2005, 12 pages.
Geordie, "First Ever DBM Trained Using a Quantum Computer," URL:https://dwave.wordpress.com/2014/01/06 /first-ever-dbm-trained-using-a-quantum-computer/, Jan. 6, 2014, 8 pages.
Geordie, "Training DBMs with Physical neural nets" In Hack The Multiverse, Jan. 24, 2014, pp. 2-5.
Grassberger, "Entropy Estimates from Insufficient Samplings," arXiv:physics/0307138v2 [physics.data-an], Jan. 4, 2008, 5 pages.
Gomez-Bombarelli et al., "Automatic Chemical Design Using a Data-Driven Continuous Representation of Molecules," arXiv:1610. 02415v3: Dec. 2017. (26 pages).
Goodfellow et al., "Generative Adversarial Nets", arXiv:1406. 2661v1 [stat.ML], 9 pages, Jun. 10, 2014.
Husmeier, "Introduction to Learning Bayesian Networks from Data", Probabilistic Modeling in Bioinformatics and Medical Informatics 2005. https://link.springer.com/chapter/10.1007/1-84628-119-9_2.
Jang, et al., "Categorical reparameterization with Gumbel-Softmax", arXiv:1611.01144 Aug. 5, 2017. https://arxiv.org/abs/1611.01144.
Jiang, et al., "Learning a discriminative dictionary for sparse coding via label consistent K-SVD", In CVPR 2011 (pp. 1697-1704) IEEE. June,Year 2011).
Khalek, Shadi A, et al., "Automated SQL Query Generation for Systematic Testing of Database Engines", In proceedings of the IEEE/ACM International Conference of Automated Software Engineering pp. 329-332. Association of Computing Machinery. (Year: 2008).
KingmA, et al., "Adam: A method for stochastic optimization", arXiv:1412.6980 Jan. 30, 2017. https://arxiv.org/abs/1412.6980.
Kingma, et al., "Auto-encoding variational bayes". arXiv:1312. 5258v1, May 1, 2014. https://aixiv.org/abs/1312.6114.
Kingma, Diederik P, et al., "Semi-Supervised Learning with Deep Generative Models", arXiv:1406,5298v2 [cs.LG], Oct. 31, 2014, 9 pages.
Raymond, et al., "Systems and Methods for Comparing Entropy and KL Divergence of Post-Processed Samplers," U.S. Appl. No. 62/322,116, filed Apr. 13, 2016, 47 pages.
Korenkevych, et al., "Benchmarking quantum hardware fortraining of fully visible boltzmann machines", arXiv:1611.04528 Nov. 14, 2016. https://arxiv.org/abs/1611.04528.
Krause, et al., "The Unreasonable Effectiveness of Noisy Data for Fine-Grained Recognition", 2016, Springer International Publishing AG, ECCV Part III, LNCS 9907, pp. 301-320 (Year:2016).
Kuzelka, Ondrej, et al., "Fast Estimation of First-Order Clause Coverage through Randomization and Maximum Likelihood", In proceeding of the 25th International Conference on Machine Learning (pp. 504-5112). Association for Computing Machinery (Year:2008).
L.Wan, M. Zieler, et al., "Regularization of Neural Networks using DropConnect" ICML, 2013.
Le Roux, Nicolas, et al., "Representational Power of Restricted Boltzmann Machines and Deep Belief Networks", Dept. IRO, University of Montréal Canada, Technical Report 1294, Apr. 18, 2007, 14 pages.
LEE, et al., "Efficient sparse coding algorithm", NIPS, 2007,pp. 801-808.
Rezende, et al., "Stochastic Backpropagation and Approximate inference in Deep Generative Models," arXiv:1401.4082v3 [stat. ML] May 30, 2014, 14 pages, https://arxiv.org/abs/1401.4082.
Lee, H., et al., "Sparse deep belief net model for visual area v2". Advances in Neural Information Processing Systems, 20. MIT Press, 2008.
Li, et al., "R/'enyi Divergence Variational Inference", arXiv:1602. 02311 Oct. 28, 2016. https://arxiv.org/abs/1602.02311.
Lin, et al., "Efficient Piecewise Training of Deep Structured Models for Semantic Segmentation". arXiv:1504.01013v4, 2016.
Lovasz, et al., "A Correction: orthogonal representations and connectivity of graphs", Linear Algebra and it's Applications 313:2000 pp. 101-105.
Lovasz, et al., "Orthogonal Representations and Connectivity of Graphs", Linear Algebra and its applications 114/115; 1989, pp. 439-454.
Macready, et al., "Applications of Hardware Boltzmann Fits". U.S. Appl. No. 61/515,742, filed Aug. 5, 2011, 11 ages.
Macready, et al., "Applications of Hardware Boltzmann Fits". U.S. Appl. No. 61/540,208, filed Sep. 28, 2011, 12 pages
Macready, et al., "Applications of Hardware Boltzmann Fits". U.S. Appl. No. 61/505,044, filed Jul. 6, 2011.
Macready, et al., "Systems and Methods for Minimizing an Objective Function". U.S. Appl. No. 61/550,275, filed Oct. 21, 2011, 26 pages.
Macready, et al., "Systems and Methods for Minimizing an Objective Function", U.S. Appl. No. 61/557,783, filed Nov. 9, 2011, 45 pages.
Maddison, et al., "The concrete distribution: A continuous relaxation of discrete random variables", arXiv:1611.00712 Mar. 5, 2017. https://arxiv.org/abs/1611.00712.
Makhzani, Alireza, et al., "Adversarial Autoencoders" acXiv:1511. 05644v2 [cS.LG]. May 25, 2016, 16 pages.
Mandt, et al., "A Variational Analysis of Stochastic Gradient Algorithms", arXiv: 1602.02666 Feb. 8, 2016. https://arxiv.org/abs/1602.02666.
Misra, et al., "Seeing through the Human Reporting Bias: Visual Classifiers from Noisy Human-Centric Labels", 2016 IEEE Conference on Computer Vision and Pattern Recognition, IEEE, 2016, pp. 2930-2939.
Misra, et al., "Visual classifiers from noisy humancentric labels". In The IEEE Conference on Computer Vision and Pattern Recognition (CVPR), 2016.
Mnih, et al., "Neural variational inference and learning in belief networks". arXiv:1402.0030 Jun. 4, 2016. https://arxiv.org/abs/1402.0030.
Mnih, et al., "Variational inference for Monte Carlo objectives". arXiv:1602.06725, Jun. 1, 2016. https://arxiv.org/abs/1602.06725.
Mnih, Andriy, et al., "Variational Inference for Monte Carlo Objectives", Proceedings of the 33rd International Conference on Machine Learning, New York, NY USA, 2016, JMLR: W&CP vol. 48, 9 pages.

(56) References Cited

OTHER PUBLICATIONS

Molchanov, Dmitry, et al., "Variational Dropout Sparsities Deep Neural Networks", https://arxiv.org/pdf/1701.05369v1.pdf, Jan. 19, 2017.

Murphy, "A Brief Introduction to Graphical Models and Bayesian Networks", Oct. 14, 2001. https://www.cs.ubc.ca/~murphyk/Bayes/bayes_tutorial.pdf.

Murphy, "Machine Learning: a probalistic perspective", MIT Press, 2012. http://noiselab.ucsd.edu/ECE228/Murphy_Machine_Learning.pdf.

Muthukrishnan, et al., "Classical and quantum logic gates: an introduction to quantum computing", Quantum information seminar, )Year: 1999) 22 pages.

N. Srivastava, G. Hinton, et al., "Dropout: A Simple Way to Prevent Neural Networks from Overtting". ICML 15 (Jun):19291958, 2014.

Neal, et al., "Mcmc Using Hamiltonian Dynamics", Handbook of Markov Chain Monte Carlo 2011.

Neven, et al., "Training a binary classifier with the quantum adiabatic algorithm", arXiv preprint arXivc:0811.0416, 2008, 11 pages.

Nowozin, Sebastian, et al., "f-GAN: Training Generative Neural Samplers using Variational Divergence Minimization", arXiv: 1606.00709v1 [stat.ML], 17 pages., Jun. 2, 2016.

Olshausen, Bruno A, et al., "Emergence of simple cell receptive field properties by learning a sparse code for natural images", Nature, vol. 381, Jun. 13, 1996, pp. 607-609.

Patrini, et al., Making Neural Networks robust to label noise: a loss correction approach. arXiv: 1609.03683 (2016).

Phua, et al., "A comprehensive survey", arXiv:1009.6119 Aug. 30, 2010. https://arxiv.org/abs/1009.6119.

Pozzolo, et al., "Learned Lessons in credit card fraud detection from a practitioner perspective", Feb. 18, 2014. https://www.semanticscholar.org/paper/Learned-lessons-in-credit-card-fraud-detection-from-Pozzolo-Caelen/6d2e2a1caf5b3757ed0e8f404eabb3154605698a.

Rasmus, Antti, et al., "Semi-Supervsed Learning with Ladder Networks", arXiv:1507.02672v2 [cs.NE] Nov. 24, 2015, 19 pages.

Rezende, Danilo J, et al., "Variational Inference with Normalizing Flows", Proceedings of the 32nd International Conference on Machine Learning, Lille, France 2015, JMLR: W&CP vol. 37, 9 pages.

Rolfe, "Discrete variational autoencoders" arXiv:1609.02200 Apr. 22, 2017. https://arxiv.org/abs/1609.02200.

Rose, et al., "Systems and Methods for Quantum Processing of Data, for Example Functional Magnetic Resonance Image Data". U.S. Appl. No. 61/841,129, filed Jun. 28, 2013, 129 pages.

Rose, et al., "Systems and Methods for Quantum Processing of Data, for Example Imaging Data". U.S. Appl. No. 61/873,303, filed Sep. 3, 2013, 38 pages.

Salakhutdinov, R., "Learning deep Boltzmann machines using adaptive MCMC", 2010.

Salakhutdinov, R., "Learning in Markov random transitions.elds using tempered", 2009.

Salakhutdinov, R. & Murray, I., "On the quantitative analysis of deep belief networks", 2008.

Saliman, Tim, "A Structured Variational Auto-encoder for Learning Deep Hierarchies of Sparse Features", arXiv:1602.08734v1 [stat.ML] Feb. 28, 2016, 3 pages.

Salimans, Tim, et al., "Markov Chain Monte Carlo and Variational Inference: Bridging the Gap", arXiv:1410.6460v4 [stat.CO] May 19, 2015, 9 pages.

Schulman, et al., "Gradient estimation using stochastic computing graphs". arXiv:1506.05254, Jan. 5, 2016. https://arxiv.org/abs/1506.05254.

Schwartz-Ziv, et al., "Opening the black box of Deep Neural Networks via Information", arXiv:1703.00810 Apr. 29, 2017. https://arxiv.org/abs/1703.00810.

Sethi, et al., "A revived survey of various credit card fraud detecion techniques", International Journal of Computer Science and Mobile Computing Apr. 14, 2014. https://tarjomefa.com/wp-content/uploads/2018/08/TarjomeFa-F994-English.pdf.

Shahriari, et al., "Taking the human out of the loop: A review of bayesian optimization", Proceedings of the IEEE 104 Jan. 1, 2016.

Silver, et al., "Mastering the game of Go with deep neural networks and tree search". Nature, 529, 484489, 2016.

Smelyanskiy, et al., "A near-term quantum computing approach for hard computational problems in space exploration" arXiv preprint arXir:1204.2821 (year:2012).

Sonderby, et al., "Ladder Variational Autoencoders", arXiv:1602.02282v3 [stat.ML] May 27, 2016, 12 pages.

Sprechmann, et al., "Dictionary learning and sparse coding for unsupervised clustering", in 2010 IEEE international conference on acoustics, speech and signal processing (pp. 2042-2045) IEEE (year:2010).

Sutton, "Learning to Predict by the Methods of Temporal Differences", https://webdocs.cs.ualberta.ca/ sutton/papers/sutton-88-with-erratum.pdf.

Sutton, R., et al., "Policy gradient methods for reinforcement learning with function approximation". Advances in Neural Information Processing Sytems, 12, pp. 1057-1063, MIT Press, 2000.

Suzuki, et al., "Joint Multimodal Learning With Deep Generative Models", Nov. 7, 2016, arXiv:1611.0189v1 (Year 2016).

Szegedy, et al., "Rethinking the Inception Architecture for Computer Vision", 2016, Proceedings of the IEEE Conference on Computer Vision and Pattern Recognition (CVPR), pp. 2818-2826 (Year: 2016)

Tieleman, T. & Hinton, G., "Using fast weights to improve persistent contrastive divergence", 2009.

Tokui, et al., "Evaluating the variance of likelihood-ratio gradient estimators", Proceedings of the 34th International Conference on Machine Learning, 2017. http://proceedings.mlr.press/v70/tokul17a.html.

Tripathi, et al., "Survey on credit card fraud detection methods", Internation Journal of Emerging Technology and Advanced Engineering Nov. 12, 2012.

Tucker, et al., "Rebar: Low-variance, unbiased gradient estimates for discrete latent variable models". arXiv:1703.07370, Nov. 6, 2017. https://aixiv.org/abs/1703.07370.

Vahdat, "Machine Learning Systems and Methods for Training With Noisy Labels," U.S. Appl. No. 62/427,020, filed Nov. 28, 2016, 30 pages.

Vahdat, "Machine Learning Systems and Methods for Training With Noisy Labels," U.S. Appl. No. 62/508,343, filed May 18, 2017, 46 pages.

Vahdat, "Toward Robustness against Label Noise in Training Deep Disciminative Neural Networks". arXiv:1706.00038v2, Nov. 3, 2017. https://arxiv.org/abs/1706.00038.

Vahdat, et al., "Dvae++: Discrete variational autoencoders with overlapping transformations", arXiv:1802.04920 May 25, 2018. https://aixiv.org/abs/1802.04920.

Van Det Maaten, et al., "Hidden unit conditional random Fields", 14th International Conference on Artificial Intelligence and Statistics, 2011.

Veit, et al., "Learning From Noisy Large-Scale Datasets With Minimal Supervision". arXiv:1701.01619v2, Apr. 10, 2017. https://arxiv.org/abs/1701.01619.

Wan, L., et al., "Regularization of Neural Networks using DropConnec". ICML 2013.

Wang, et al., "Classification of common human diseases derived from shared genetic and environmental determinants", Nature Genetics Aug. 7, 2017. https://www.nature.com/articles/ng.3931.

Welling, et al., "Bayesian learning via stochastic gradient langevin dynamics", ICML Jun. 28, 2011. https://dl.acm.org/doi/10.5555/3104482.3104568.

Wiebe, Nathan, et al., "Quantum Inspired Training for Boltzmann Machines", arXiv:1507.02642v1 [cs.LG] Jul. 9, 2015, 18 pages.

Williams, "Simple Statistical Gradient-Foilowing Algorithms for Connectionist Reinforcement Learning," Springer, College of Computer Science, Northeastern University, Boston, MA, 1992, 27 pages, https://link.springer.com/article/10.1007/BF00992696.

Wittek, Peter, "What Can We Expect from Quantum Machine Learning". Yandex 1-32 School of Data Analysis Conference Machine Learning: Prospects and Applications, Oct. 5, 2015. pp. 1-16.

(56) References Cited

OTHER PUBLICATIONS

Xiao, et al., "Learning from massive noisy labeled data for image classification". The IEEE Conference on Computer Vision and Pattern Recognition (CVPR) 2015.
Xie, et al., "A Theory of Generative ConvNet" ICML 2016.
Xing, "Bayesian and Markov Networks: A unified view", Carnegie Mellon: School of Computer Science Sep. 19, 2007. http://www.cs.cmu.edu/~epxing/Class/10708-07/Slides/lecture3-BN&MRF.pdf.
Zhang, Yichuan, et al., "Continuous Relaxations for Discrete Hamiltonian Monte Carlo", School of Informatic, University of Edinburgh, Dept of Engineering, University of Cambridge, United Kingdom, 9 pages.
Zheng, et al., "Graph regularized sparse coding for image representation", IEEE transaction on image processing, 20 (5), (Year: 2010) 1327-1336.
"On the Challenges of Physical Implementations of RBMs", arXiv:1312.5258V1 [stat.ML] Dec. 18, 2013, XP-002743443, 9 pages.
Adachi, S.H. et al., "Application of Quantum Annealing to Training of Deep Neural Networks," URL:https://arxiv.org/ftp/arxiv/papers/151 0/1510.06356.pdf, Oct. 21, 2015, 18 pages.
Amin, "Effect of Local Minima on Adiabatic Quantum Optimization," Physical Review Letters 100(130503), 2008, 4 pages.
Hjelm, "Boundary-Seeking Generative Adversarial Networks", arXiv:1702.08431v4 [stat.ML], 17 pages, Feb. 21, 2018.
International Search Report and Written Opinion for PCT/US2018/065286, dated Apr. 16, 2019, 11 pages.
International Search Report and Written Opinion for PCT/US2019/017124, dated May 30, 2019, 28 pages.
International Search Report, dated May 10, 2017, for International Application No. PCT/US2017/015401, 3 pages.
International Search Report, dated Nov. 18, 2016, for International Application No. PCT/US2016/047627, 3 pages.
Jaakkola et al., "Improving the Mean Field Approximation Via the Use of Mixture Distributions," 1998, 11 pages.
Jenatton, R. et al., "Proximal Methods for Hierarchical Sparse Coding," arXiv:1009.2139v4 [stat.ML], Jul. 5, 2011, 38 pages.
Katzgraber et al., "Glassy Chimeras Could Be Blind to Quantum Speedup: Designing Better Benchmarks for Quantum Annealing Machines," Physical Review X(4):021008, 2014. (8 pages).
Khalek, S. et al., "Automated SQL Query Generation for Systematic Testing of Database Engines," ASE '10: Proceedings of the IEEE/ACM international conference on Automated software engineering, 2010, 4 pages.
Krähenbühl, P. et al., "Efficient Inference in Fully Connected CRFs with Gaussian Edge Potentials," arXiv:1210.5644 [cs.CV], 2012, 9 pages.
Kuželka, O. et al., "Fast Estimation of First-Order Clause Coverage through Randomization and Maximum Likelihood," ICML '08: Proceedings of the 25th international conference on Machine learning, 2008, 8 pages.
Lafferty, J. et al., "Conditional Random Fields: Probabilistic Models for Segmenting and Labeling Sequence Data," Proceedings of the 18th International Conference on Machine Learning 2001, 10 pages.
Li, X., et al., "Collaborative Variational Autoencoder for Recommender Systems," Published in KDD, Halifax, NS, Canada, Aug. 13-17, 2017, pp. 305-314.
Minh, V. et al., "Learning to Label Aerial Images from Noisy Data," Proceedings of the 29th International Conference on Machine Learning, Edinburgh, Scotland, 2012, 8 pages.
Mirza et al., "Conditional Generative Adversarial Nets", arXiv:1411.1784v1 [cs.LG], 7 pages, Nov. 6, 2014.
Mocanu et al., "A topological insight into restricted Boltzmann machines," Pre-print version: arXiv:1604.05978v2: Jul. 2016. (25 pages).
Murray, I. et al., "Bayesian Learning in Undirected Graphical Models: Approximate MCMC Algorithms," UAI '04: Proceedings of the 20th conference on Uncertainty in Artificial Intelligence, 2004, 8 pages.

Natarajan, N. et al., "Learning with Noisy Labels," Advances in Neural Information Processing Systems 26, 2013, 9 pages.
Neven, H. et al., "QBoost: Large Scale Classifier Training with Adiabatic Quantum Optimization," JMLR: Workshop and Conference Proceedings 25, 2012, 16 pages.
Paninski, "Estimation of Entropy and Mutual Information," Neural Computation 15:1191-1253, 2003.
Prakash, "Quantum Algorithms for Linear Algebra and Machine Learning," Doctoral Thesis, Technical Report No. UCB/EECS-2014-211, University of California at Berkeley, 2014, pp. 1-9.
Quattoni, A. et al., "Hidden Conditional Random Fields," IEEE Transactions on Pattern Analysis and Machine Intelligence, 29(10), 2007, 6 pages.
Reed et al., "Training Deep Neural Networks on Noisy Labels with Bootstrapping," arXiv:1412.6596v3 [cs.CV] Apr. 15, 2015, 11 pages.
Rezende et al., "Stochastic Backpropagation and Approximate Inference in Deep Generative Models," arXiv:1401.4082v3 [stat.ML] May 30, 2014, 14 pages.
Rolfe et al., "Discrete Variational Auto-Encoder Systems and Methods for Machine Learning Using Adiabatic Quantum Computers," U.S. Appl. No. 62/462,821, filed Feb. 23, 2017, 113 pages.
Rolfe et al., "Discrete Variational Auto-Encoder Systems and Methods for Machine Learning Using Adiabatic Quantum Computers," U.S. Appl. No. 62/404,591, filed Oct. 5, 2016, 87 pages.
Rolfe et al., "Systems and Methods for Machine Learning Using Adiabatic Quantum Computers," U.S. Appl. No. 62/207,057, filed Aug. 19, 2015, 39 pages.
Rolfe, "Discrete Variational Auto-Encoder Systems and Methods for Machine Learning Using Adiabatic Quantum Computers," U.S. Appl. No. 62/206,974, filed Aug. 19, 2015, 43 pages.
Rolfe, "Discrete Variational Auto-Encoder Systems and Methods for Machine Learning Using Adiabatic Quantum Computers," U.S. Appl. No. 62/268,321, filed Dec. 16, 2015, 52 pages.
Rolfe, "Discrete Variational Auto-Encoder Systems and Methods for Machine Learning Using Adiabatic Quantum Computers," U.S. Appl. No. 62/307,929, filed Mar. 14, 2016, 67 pages.
Rose et al., "First ever DBM trained using a quantum computer", Hack the Multiverse, Programming quantum computers for fun and profit, XP-002743440, Jan. 6, 2014, 8 pages.
Ross, S. et al., "Learning Message-Passing Inference Machines for Structured Prediction," CVPR 2011, 2011,8 pages.
Scarselli, F. et al., "The Graph Neural Network Model," IEEE Transactions on Neural Networks, vol. 20, No. 1,2009, 22 pages.
Spall, "Multivariate Stochastic Approximation Using a Simultaneous Perturbation Gradient Approximation," IEEE Transactions on Automatic Control 37(3):332-341, 1992.
Strub, F., et al. "Hybrid Collaborative Filtering with Autoencoders," arXiv:1603.00806v3 [cs.IR], Jul. 19, 2016, 10 pages.
Sukhbaatar et al., "Training Convolutional Networks with Noisy Labels," arXiv:1406.2080v4 [cs.CV] Apr. 10, 2015, 11 pages.
Tieleman, T., "Training Restricted Boltzmann Machines using Approximation to the Likelihood Gradient," ICML '08: Proceedings of the 25th international conference on Machine learning, 2008, 8 pages.
Van Baalen, M. "Deep Matrix Factorization for Recommendation," Master's Thesis, Univ.of Amsterdam, Sep. 30, 2016, URL: https://scholar.google.co.kr/scholar?q=Deep+Matrix+Factorization+for+Recommendation&hl=ko&as_sdt=O&as_vis=l&oi=scholar, 99 pages.
Van der Maaten, L. et al., "Hidden-Unit Conditional Random Fields," Journal of Machine Learning Research 15, 2011, 10 Pages.
Venkatesh, et al., "Quantum Fluctuation Theorems and Power Measurements," New J. Phys., 17, 2015, pp. 1-19.
Wang, Discovering phase transitions with unsupervised learning, Physical Review B 94, 195105 (2016), 5 pages.
Williams, "Simple Statistical Gradient-Following Algorithms for Connectionist Reinforcement Learning," College of Computer Science, Northeastern University, Boston, MA, 1992, 27 pages.
Written Opinion of the International Searching Authority, dated Nov. 18, 2016, for International Application No. PCT/US2016/047627, 9 pages.
Zhu, X. et al., "Combining Active Learning and Semi-Supervised Learning Using Gaussian Fields and Harmonic Functions," ICML

(56) References Cited

OTHER PUBLICATIONS 2003 workshop on The Continuum from Labeled to Unlabeled Data in Machine Learning and Data Mining, 2003, 8 pages.
Amin, et al., "Quatum Boltzmann Machine". arXiv:1601.02036v1, Jan. 8, 2016.
Anonymous, "A Robust Learning Approach to Domain Adaptive Object Detection". CVPR, 2019.
Azadi, et al., "Auxiliary Image Regulation for Deep CNNs with Noisy Labels". arXiv:1511.07069v2 (2016).
B. Sallans and G.E. Hitton, "Reinforcement Learning with Factored States and Actions". JMLR, 5:1063-1088, 2004.
Bach, et al., "Optimization with Sparsity-Inducing Penalties". arXiv:1108.0775v2, Nov. 22, 2011.
Bahnsen, et al., "Feature Engineering Strategies for Credit Card Fraud Detection", Expert systems with applications Elsevier Jun. 1, 2016. https://www.sciencedirect.com/science/article/abs/pii/S09574174150083867via%3Dihub.
Barron-Romero, Carlos, "Classical and Quantum Algorithms for the Boolean Satisfiability Problem", CoRR, Abs/1510.02682)Year:2015).
Bearman, et al., "What's the Point: Semantic Segmentation with Point Supervision". ECCV, Jul. 23, 2016. https://arxiv.org/abs/1506.02106.
Bell, et al., "The "Independent Components" of Natural Scenes are Edge Filters", Vision Res. 37(23) 1997,:pp. 3327-3338.
Bellman, R. E., "Dynamic Programming". Princeton University Press, Princeton, NJ. Republished 2003: Dover, ISBN 0-486-42809-5.
Bhattacharyya, et al., "Data mining for credit card fraud: A comparitive study", Decision Support Systems 2011. https://www.semanticscholar.org/paper/Data-mining-for-credit-card-fraud%3A-A-comparative-Bhattacharyya-Jha/9d26f0ba02ee5efe9b9c7bdcb5f528c8b8253cf7.
Bian, et al., "The Ising Model: teaching an old problem new tricks", D-wave systems. 2 (year 2010), 32 pages.
Bielza, et al., "Bayesian networks in neuroscience: a survey", Oct. 16, 2014, Frontiers in Computational Neuroscience, vol. 8, Article 131, p. 1-23 (Year: 2014).
Bolton, et al., "Statistical fraud detection: A review", Statistical Science 17(3) Aug. 1, 2002. https://projecteuclid.org/journals/statistical-science/volume-17/issue-3/Statistical-Fraud-Detection-A-Review/10.1214/ss/1042727940.full.
Burda, et al., "Importance Weighted Autoencoders", arXiv: 1509.00519 Nov. 7, 2016. https://arxiv.org/abs/1509.00519.
Buss, "Introduction to Inverse Kinematics with Jacobian Transpose, Pseudoinverse and Damped Least Squares methods", Mathematics UCS 2004. https://www.math.ucsd.edu/~sbuss/ResearchWeb/ikmethods/iksurvey.pdf.
Chen, et al., "Domain Adaptive Faster R-CNN for Object Detection in the Wild". IEEE Xplore, 2018. https://arxiv.org/abs/1803.03243.
Chen, et al., "Stochastic Gradient Hamiltonian Monte Carlo", arXiv: 1402.4102 May 12, 2014. https://arxiv.org/abs/1402.4102.
Cho, Kyunghyun, et al., "On the Properties of Neural Machine Translation: Encoder-Decoder Approaches", arXiv:1409.1259v2, [cs.CL] Oct. 7, 2014, 9 pages.
Cho, K-H., Raiko, T, & Ilin, A., "Parallel tempering is efficient for learning restricted Boltzmann machines", 2010.
Courbariaux, M., et al., "Binarized Neural Networks: Training Neural Networks with Weights and Activations Constrained to +1 or −1". http://arxiv.org/pdf/1602.02830.pdf.
Dai, et al., "Generative Modeling of Convolutional Neural Networks". ICLR 2015.
Doersch, "Tutorial on variational autoencoders", arXiv:1606.05908 Jan. 3, 2021. https://arxiv.org/abs/1606.05908.
Dumoulin, et al., "On the Challenges of Physical Implementations of RBMs", https://arxiv.org/abs/1312.5258v2, Oct. 28, 2014.
Fabius, Otto, et al., "Variational Recurrent Auto-Encoders", Accepted as workshop contributions at ICLR 2015, 5 pages.
Fischer, A. & Igel, C., "A bound for the convergence rate of parallel tempering for sampling restricted Boltzmann machines", 2015.
Friedman, et al., "Learning Bayesan Networks from Data", Stanford Robotics, http://robotics.stanford.edu/people/nir/tutorial/index.html.
G. Hinton, N. Srivastava, et al., "Improving neural networks by preventing co-adaptation of feature detectors". CoRR, abs/1207.0580, 2012.
G.A. Rummeryand M. Niranjan, "Online Q-Learning using Connectionist Systems". CUED/FINFENG/TR 166, Cambridge, UK, 1994.
Gal, et al., "Bayesian Convolutional Neural Networks With Bernoulli Approximate Variational Inference". arXiv: 1506.02158v6, 2016.
Glynn, "Likelihood ratio gradient estimation for stochastic systems". Communications of the ACM, 1990. https://di.acm.org/doi/10.1145/84537.84552.
Gomez-Bombarelli, et al., "Automatic chemical designs using a data-driven continuous representation of molecules", arXiv:1610.02415 Dec. 5, 2017. https://arxiv.org/abs/1610.02415.
Grathwohl, et al., "Backpropagation through the void: Optimizing control variates for black-box gradient etimation". arXiv:1711.00123, Feb. 23, 2018. https://arxiv.org/abs/1711.00123.
Gregor, et al., "Deep autoregressive networks". arXiv:1310.8499, May 20, 2014. https://arxiv.org/abs/1310.8499.
Gregor, Karol, et al., "DRAW: A Recurrent Neural Network For Image Generation", Proceedings of the 32nd International Conference on Machine Leaning, Lille, France, 2015, JMLR: W&CP vol. 37. Copyright 2015, 10 pages.
Gu, et al., "Muprop: Unbiased backpropagation for stochastic neural networks". arXiv:1511.05176, Feb. 25, 2016. https://arxiv.org/abs/1511.05176.
Hamze, "Sampling From a Set Spins With Clamping". U.S. Appl. No. 61/912,385, filed Dec. 5, 2013, 35 pages.
Hees, "Setting up a Linked Data mirror from RDF dumps". Jörn's Blog, Aug. 26, 2015. SciPy Hierarchical Clustering and Dendrogram Tutorial | Jörn's Blog (joernhees.de).
Heess, N., et al., "Actor-Critic Reinforcement Learning with Energy-based Policies". JMLR, 24:43-57, 2012.
Heidrich-Meisner, et al., "Reinforcement Learning in a Nutshell". http://image.diku.dk/igel/paper/RLiaN.pdf.
Hidasi, et al., "Session-based recommendations with recurrent neural networks", ICRL Mar. 29, 2016. https://arxiv.org/abs/1511.06939.
Hinton, Geoffrey, "A Practical Guide to Training Restricted Boltzmann Machines", Version 1, Department of Computer Science University of Toronto, Aug. 2, 2010, 21 pages.
Hurley, Barry, et al., "Proteus: A hierarchical Portfolio of Solvers and Transformations", arXiv:1306.5606v2 [cs.AI], Feb. 17, 2014, 17 pages.
Hinton, Geoffrey E, et al., "Autoencoders, Minimum Description Length and Helmholtz Free Energy", Department of Computer Science, University of Toronto, Computation Neuroscience Laboratory, The Salk Institute, Mar. 1, 2001, 9 pages.
Hinton, Geoffrey E, et al., "Reducing the Dimensionality of Data with Neural Networks", Science, wwwsciencemag.org, vol. 313, Jul. 28, 2006, pp. 504-507.
Humphrys, M., http://computing.dcu.ie/ humphrys/PhD/ch2.html.
"An implementation of the high-throughput computing system using the GPU (005)", no English translations, 2019-516164, IEICE Technical Report, vol. 114 No 302, Nov. 13-14, 2014, 12 pages.
"Cluster Analysis", UIUC, 2013.
"Neuro-computing for Parallel and Learning Information Systems", 2019-516164, www.jstage.jst.go.jp/article/sicej/1962/27/327_3_255/_article/-char/ja,Nov. 14, 2021, 17 pages.
Achille et Soatto, "Information Dropout: Learning Optimal Representations Through Noise" Nov. 4, 2016, ICLR, arXiv: 1611.01353v1, pp. 1-12. (Year: 2016).
Hinton et al., "A Practical Guide to Training Restricted Boltzmann Machines," Springer, pp. 599-619, Jan. 1, 2012.
Hinton, Geoffrey E. . Training products of experts by minimizing contrastive divergence. Neural Computation, 14:1771-1800, 2002.
Hinton, Geoffrey, Simon Osindero, and Yee-Whye Teh. A fast learning algorithm for deep belief nets. Neural computation, 18(7): 1527-1554, 2006.

(56) References Cited

OTHER PUBLICATIONS

International Search Report and Written Opinion of the International Searching Authority, dated Jan. 4, 2018, for International Application No. PCT/US2017/053303, 16 pages.
International Search Report and Written Opinion, dated Oct. 13, 2014, for international Application No. PCT/US2014/044421, 13 pages.
Jain et al., "Estimating the class prior and posterior from noisy positives and unlabeled data" Jun. 28, 2016, arXiv: 1606.08561V1, pp. 1-19. (Year: 2016).
Japanese Office Action for Application No. JP 2019516164, dated Nov. 24, 2021, 33 pages (including English translation).
Jordan, Michael I., Zoubin Ghahramani, Tommi S Jaakkola, and Lawrence K Saul. An introduction to variational methods for graphical models. Machine learning, 37(2):183-233, 1999.
Ke et al., "Variational Convolutional Networks for Human-Centric Annotations" Nov. 20, 2016, pp. 120-135. (Year: 2016).
Korean Office Action for Application 10-2019-7012141, dated Nov. 29, 2021, 18 pages (including English translation).
Korenkevych et al., "Benchmarking Quantum Hardware for Training of Fully Visible Boltzmann Machines" Nov. 14, 2016, arXiv: 1611.04528v1, pp. 1-22. (Year: 2016).
Le, Quoc, Marc'Aurelio Ranzato, Rajat Monga, Matthieu Devin, Greg Corrado, Kai Chen, Jeff Dean, and Andrew Ng. Building high-level features using large scale unsupervised learning. In ICML'2012, 2012.
Lecun, Y., L. Bottou, Y. Bengio, and P. Haffner. Gradient based learning applied to document recognition. Proc. IEEE, 1998.
Liu et Tao, "Classification with Noisy Labels by Importance Reweighting" Mar. 2016, pp. 447-461. (Year: 2016).
Long, Philip M and Rocco Servedio. Restricted boltzmann machines are hard to approximately evaluate or simulate. In Proceedings of the 27th International Conference on Machine Learning (ICML-10), pp. 703-710, 2010.
Menon et al., "Learning from Binary Labels with Instance-Dependent Corruption" May 4, 2016, pp. 1-41. (Year: 2016).
Miyata et al., "Consideration of 2D-FFT by Decomposition-of-Large Scale Data on Multi-GPU", IEICE Technical Report, vol. 114 No. 155, Computer Systems Jul. 28-30, 2014, Abstract, 12 pages.
Nalisnick, Eric, Lars Hertel, and Padhraic Smyth, "Approximate inference for deep latent gaussian mixtures." NIPS Workshop on Bayesian Deep Learning. vol, 2. 2016. (Year: 2016).
Niv, "Reinforcement Learning in the Brain". Journal of Mathematical Psychology, 2009—Elsevier.
Non-Final Office Action issued in U.S. Appl. No. 15/822,884 dated Dec. 9, 2021, 15 pages.
Non-Final Office Action issued in U.S. Appl. No. 15/822,884 dated Feb. 17, 2022, 45 pages.
Non-Final Office Action issued in U.S. Appl. No. 16/336,625 dated Feb. 14, 2022, 22 pages.
Non-Final Office Action Issued in U.S. Appl. No. 16/562,192 dated Apr. 4, 2022, 37 pages.
Omidshafiei et al., "Hierarchical Bayesian Noise Inference for Robust Real-time Probabilistic Object Classification" Jul. 14, 2016, arXiv: 1605.01042v2, pp. 1-9. (Year: 2016)
Ororbia et al., "Online Semi-Supervised Learning with Deep Hybrid Boltzmann Machines and Denoising Autoencoders" Jan. 18, 2016, ICLR, arXiv: 1511.06964V7, pp. 1-17. (Year: 2016).
Sakkaris, et al., "QuDot Nets: Quantum Computers and Bayesian Networks", arXiv: 1607.07887v1 [quant-ph] Jul. 26, 2016, 22 page.
Salimans, Tim, and David A. Knowles. "Fixed-form variational posterior approximation through stochastic linear regression." Bayesian Analysis 8.4 (2013): 837-882. (Year: 2013).
Salimans, Tim. "A structured variational auto-encoder for learning deep hierarchies of sparse features." arXiv preprint arXiv: 1602.08734 (2016). (Year: 2016).
Serban et al., "Multi-Modal Variational Encoder-Decoders" Dec. 1, 2016, arXiv: 1612.00377v1, pp. 1-18. (Year: 2016).
Shah et al., "Feeling the Bern: Adaptive Estimators for Bernoulli Probabilities of Pairwise Comparisons" Mar. 22, 2016, pp. 1-33. Year: 2016).
Somma, R., S Boixo, and H Barnum. Quantum simulated annealing. arXiv preprint arXiv:0712.1008, 2007.
Somma, RD, S Boixo, H Barnum, and E Knill. Quantum simulations of classical annealing processes. Physical review-letters, 101(13):130504, 2008.
Suzuki, "Natural quantum reservoir computing for temporal information processing", Scientific Reports, Nature Portfolio, Jan. 25, 2022.
Tosh, Christopher, "Mixing Rates for the Alternating Gibbs Sampler over Restricted Boltzmann Machines and Friends" Jun. 2016.Year: 2016).
Tucci, "Use of a Quantum Computer to do Importance and Metropolis-Hastings Sampling of a Classical Bayesian Network", arXiv:0811.1792v1 [quant-ph] Nov. 12, 2008, 41 pages.
Van de Meent, J-W., Paige, B., & Wood, "Tempering by subsampling", 2014.
Wang et al., "Paired Restricted Boltzmann Machine for Linked Data" Oct. 2016. (Year: 2016).
Wang, W., Machta, J., & Katzgraber, H. G. "Population annealing: Theory and applications in spin glasses", 2015.
Xu et Ou "Joint Stochastic Approximation Learning of Helmholtz Machines" Mar. 20, 2016, ICLR arXiv: 1603.06170v1, pp. 1-8. (Year: 2016).
Yoshihara et al., "Estimating the Trend of Economic Indicators by Deep Learning", 2019-516164, Graduate School of System Informatics, Kobe University, 28 Annual Conferences of Japanese Society for Artificial Intelligence 2014, 10 pages.
Zhang et al., "Understanding Deep Learning Requires Re-Thinking Generalization", arXiv:1611.03530 Feb. 26, 2017. https://arxiv.org/abs/1611.03530.
Zhao et al., "Towards a Deeper Understanding of Variational Autoencoding Models", arXiv:1702.08658 Feb. 28, 2017. https://arxiv.org/abs/1702.08658.
Zojaji et al., "A Survey of Credit Card Fraud Detection Techniques: Data and Technique Oriented Perspective", arXiv:1611.06439 Nov. 19, 2016. https://arxiv.org/abs/1611.06439.

* cited by examiner

SYSTEMS AND METHODS FOR SEMANTIC SEGMENTATION

FIELD

This disclosure generally relates to machine learning techniques, and in particular to semantic segmentation of datasets using machine learning models.

BACKGROUND

Semantic segmentation is a family of techniques in computing involving classifying elements of items in a dataset. It is most commonly encountered as semantic image segmentation, a computer vision problem, where the task may be described as predicting object classes for each pixel in an image. Semantic segmentation has applications in medical imaging, self-driving cars, and other domains. Specialized forms of semantic segmentation include object instance segmentation, where elements are associated not only with a class but with a particular instance of a class; for example, for an image containing two cats, the pixels comprising each cat may be labelled with the class "cat" and (in object instance segmentation) may also be labelled "instance 1" or "instance 2" (or some other suitable label), depending on which cat the pixels belong to. The set of vectors for a given set of pixels (e.g. a whole image) is called a "mask" and is generally the output of a semantic image segmentation model.

A problem that arises with semantic segmentation is that it usually requires large quantities of carefully-labelled training data. For example, some proposed semantic image segmentation techniques involve training a convolutional neural network to receive images and output vectors of category probabilities for each pixel (e.g. cat=20%, tree=85%, . . . ). Training is usually fully-supervised, requiring each image in the training dataset to be labelled, usually as a polygon. Some have estimated that this requires 78 seconds per image on average for a human to label one instance of one class. This is quite laborious, particularly when one considers that even a small training dataset is likely to contain tens of thousands of images and encompass multiple classes.

One the training dataset has been obtained, perhaps at great cost, the convolutional neural network is usually trained based on a cross-entropy loss term, such as:

$$\max_\theta \sum_{(x,y)} \log p(y \mid x, \theta)$$

where x is the input data, y is the ground truth label (i.e. the labels provided with the training dataset), $\theta$ represents the parameters of the neural network, and $p(y|x,\theta)$ is the probability that the model currently (under the then-current values of parameters $\theta$) will yield the ground-truth label y for a given item of input data x.

Some have experimented with weakly-supervised training of semantic segmentation models. For example, Khoreva et al., *Simple does it: Weakly supervised instance and semantic segmentation,* In IEEE Conference on Computer Vision and Pattern Recognition (CVPR), 2017, propose estimating segmentation masks based on various techniques (e.g. finding the overlap between labels generated by MCG and GrabCut+) which use bounding boxes instead of fully-supervised (e.g. polygonal) labels as input. Bounding boxes are less laborious to prepare (some estimates put the cost at around 10 seconds per instance per class per image). Others suggest alternative sets of hand-crafted rules for generating segmentation masks from "weakly supervised" data such as bounding boxes; results vary between proposals and between circumstances depending on how well the authors' intuitions match the ground truth.

There is thus a general desire for systems and methods for semantic segmentation which improve the quality of results, the time taken to train, and/or the cost of obtaining suitable training data in at least some circumstances.

The foregoing examples of the related art and limitations related thereto are intended to be illustrative and not exclusive. Other limitations of the related art will become apparent to those of skill in the art upon a reading of the specification and a study of the drawings.

BRIEF SUMMARY

Aspects of the present disclosure provide systems and methods for instantiating a machine learning system for generating semantic segmentation masks over an input dataset based on a fully-supervised dataset having high-detail labels and a weakly-supervised dataset having low-detail labels. The method is executed by at least one processor in communication with at least one memory and comprises: instantiating a primary model in the at least one memory, the primary model operable to generate a high-detail prediction based on one or more parameters of the primary model and a first item from any of the input, fully-supervised, and weakly-supervised datasets; instantiating an ancillary model in the at least one memory, the ancillary model operable to generate a high-detail prediction based on one or more parameters of the ancillary model, a second item, and a low-detail label corresponding to the second item; training the one or more parameters of the ancillary model based on the fully-supervised dataset independently of the primary model; training the one or more parameters of the primary model based on the fully-supervised and weakly-supervised datasets based on one or more predictions of the ancillary model over the weakly-supervised dataset.

In some implementations, training the one or more parameters of the primary model comprises holding the one or more parameters of the ancillary model fixed while training the primary model.

In some implementations, instantiating the ancillary model comprises instantiating an encoder-decoder segmentation model comprising an encoder and a decoder and instantiating the ancillary model further comprises instantiating a mask encoder operable to transform the low-detail label into one or more representations corresponding to output of the encoder.

In some implementations, training the one or more parameters of the ancillary model comprises combining the one or more representations of the low-detail label with one or more encoded values output by the encoder to generate a combined representation and passing the combined representation to the decoder in place of the one or more encoded values.

In some implementations, training the one or more parameters of the primary model comprises determining a value of an objective function based on a first probability of a first label being generated by the primary model and further based on a second probability of the first label being generated by the ancillary model.

In some implementations, determining the value of the objective function based on the second probability comprises scaling a first term based on the first probability by a second term based on the second probability.

In some implementations, instantiating a self-correction module in the at least one memory, the self-correction module operable to generate a high-detail prediction based on a first prediction of the primary model and a second prediction of the ancillary model. In some implementations, the self-correction module is operable to generate the high-detail prediction based on a linear combination of a first distribution induced by the primary model and a second distribution induced by the ancillary model and training the one or more parameters of the primary model comprises optimizing an objective function based on the linear combination of the first and second distributions.

In some implementations, the linear combination comprises a geometric mean of the first and second distributions and training the one or more parameters of the primary model comprises optimizing an objective function based on the geometric mean of the first and second distributions.

In some implementations, training the one or more parameters of the primary model comprises determining a value of an objective function based on a first probability of a first label being generated by the primary model and further based on a second probability of the first label being generated by the ancillary model. In some implementations, determining the value of the objective function based on the second probability comprises scaling a first term based on the first probability by a second term based on the second probability. In some implementations, determining a value of an objective function based on the second probability comprises determining the second term based on the second probability of the first label being generated by the self-correction module.

In some implementations, the self-correction module is operable to generate the high-detail prediction based on a neural network having one or more parameters, the neural network operable to receive a first prediction of the primary model and a second prediction of the ancillary model as input, the method further comprising training the one or more parameters of the self-correction module based on the fully-supervised dataset. In some implementations, training the one or more parameters of the ancillary model comprises training the one or more parameters of the ancillary model over a first subset of the fully-supervised dataset; and training the one or more parameters of the self-correction module comprises pre-training the one or more parameters of the self-correction module over a second subset of the fully-supervised dataset containing one or more items not in the first subset, said pre-training done independently of the weakly-supervised dataset. In some implementations, training the one or more parameters of each of the self-correction module and primary model comprises training the self-correction module and primary model together over at least a portion of the fully-supervised dataset and at least a portion of the weakly-supervised dataset after pre-training the self-correction module.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Introductory Generalities

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Computing Systems

Figure 1:
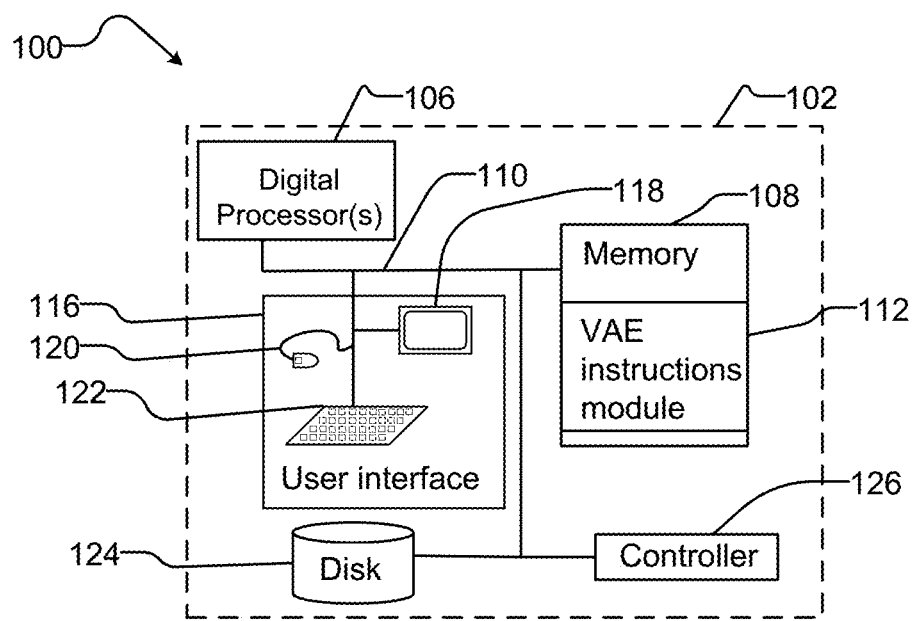
FIG. 1 is schematic of an example computing system for executing the methods disclosed herein.

FIG. 1 illustrates a computing system 100 comprising a digital computer 102. The example digital computer 102 includes one or more digital processors 106 that may be used to perform classical digital processing tasks. Digital computer 102 may further include at least one system memory 108, and at least one system bus 110 that couples various system components, including system memory 108 to digital processor(s) 106. System memory 108 may store a machine learning instructions module 112.

The digital processor(s) 106 may be any logic processing unit or circuitry (e.g., integrated circuits), such as one or more central processing units ("CPUs"), graphics processing units ("GPUs"), digital signal processors ("DSPs"), application-specific integrated circuits ("ASICs"), programmable gate arrays ("FPGAs"), programmable logic controllers ("PLCs"), etc., and/or combinations of the same.

In some implementations, computing system 100 comprises an analog computer 104, which may include one or more quantum processors 114. Digital computer 102 may communicate with analog computer 104 via, for instance, a controller 126. Certain computations may be performed by analog computer 104 at the instruction of digital computer 102, as described in greater detail herein.

Digital computer 102 may include a user input/output subsystem 116. In some implementations, the user input/output subsystem includes one or more user input/output components such as a display 118, mouse 120, and/or keyboard 122.

System bus 110 can employ any known bus structures or architectures, including a memory bus with a memory controller, a peripheral bus, and a local bus. System memory 108 may include non-volatile memory, such as read-only memory ("ROM"), static random access memory ("SRAM"), Flash NAND; and volatile memory such as random access memory ("RAM") (not shown).

Digital computer 102 may also include other non-transitory computer- or processor-readable storage media or non-volatile memory 124. Non-volatile memory 124 may take a variety of forms, including: a hard disk drive for reading from and writing to a hard disk (e.g., magnetic disk), an optical disk drive for reading from and writing to removable optical disks, and/or a solid state drive (SSD) for reading from and writing to solid state media (e.g., NAND-based Flash memory). The optical disk can be a CD-ROM or DVD, while the magnetic disk can be a rigid spinning magnetic disk or a magnetic floppy disk or diskette. Non-volatile memory 124 may communicate with digital processor(s) via system bus 110 and may include appropriate interfaces or controllers 126 coupled to system bus 110. Non-volatile memory 124 may serve as long-term storage for processor- or computer-readable instructions, data structures, or other data (sometimes called program modules) for digital computer 102.

Although digital computer 102 has been described as employing hard disks, optical disks and/or solid state storage media, those skilled in the relevant art will appreciate that other types of nontransitory and non-volatile computer-readable media may be employed, such magnetic cassettes, flash memory cards, Flash, ROMs, smart cards, etc. Those skilled in the relevant art will appreciate that some computer architectures employ nontransitory volatile memory and nontransitory non-volatile memory. For example, data in volatile memory can be cached to non-volatile memory. Or a solid-state disk that employs integrated circuits to provide non-volatile memory.

Various processor- or computer-readable instructions, data structures, or other data can be stored in system memory 108. For example, system memory 108 may store instruction for communicating with remote clients and scheduling use of resources including resources on the digital computer 102 and analog computer 104. Also for example, system memory 108 may store at least one of processor executable instructions or data that, when executed by at least one processor, causes the at least one processor to execute the various algorithms described elsewhere herein, including machine learning related algorithms. For instance, system memory 108 may store a machine learning instructions module 112 that includes processor- or computer-readable instructions to provide a machine learning model. Such provision may comprise training and/or performing inference with a convolutional neural network and/or other machine learning model, e.g., as described in greater detail herein.

Weakly-Supervised Semantic Segmentation

Aspects of the present disclosure provide a semantic segmentation model having a primary segmentation model and an ancillary segmentation model. (For convenience, these are generally referred to herein as the primary model and the ancillary model.) The primary model may be structured and used for inference according to existing knowledge and/or as described herein. The ancillary model assists with training the primary model in a weakly-supervised capacity. Much of the present disclosure relates to the structure of the ancillary model and methods for training the primary and ancillary models.

Figure 2A:
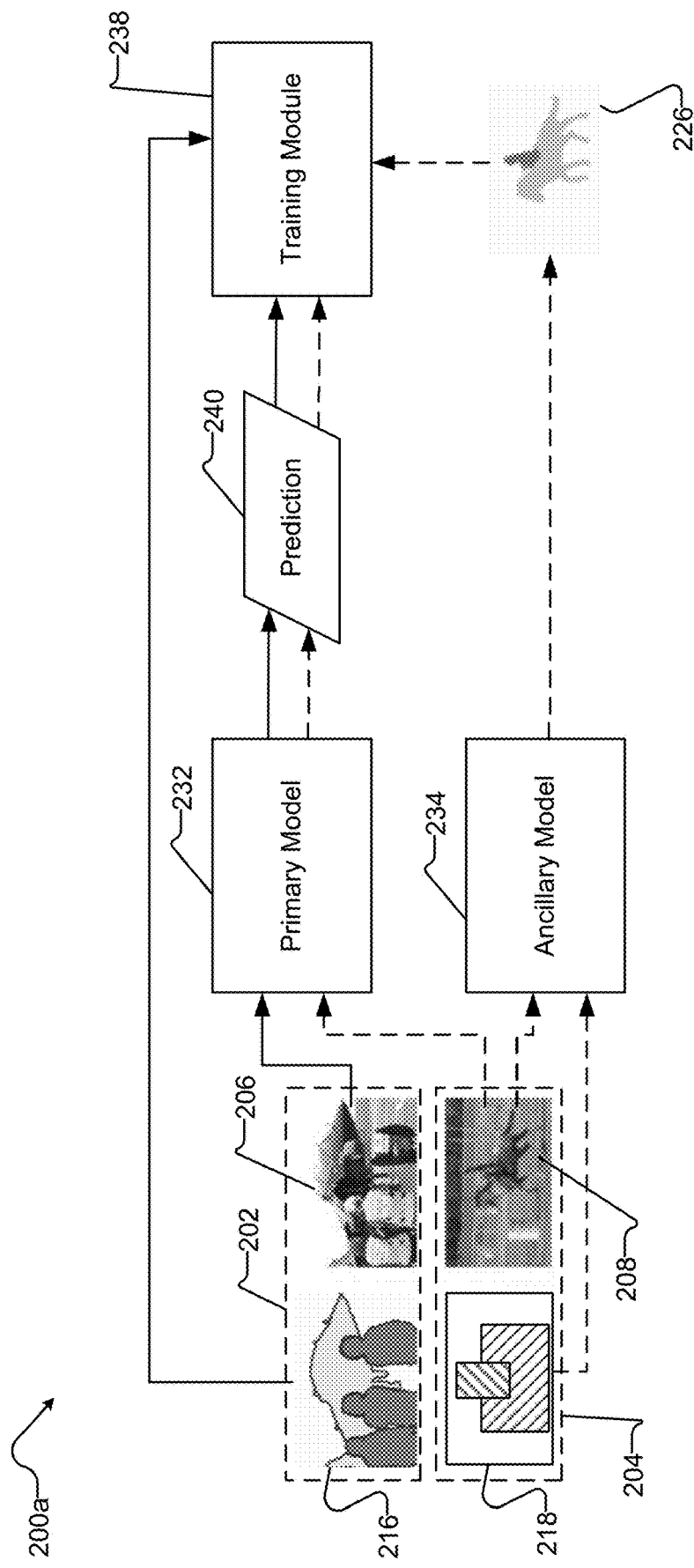
FIG. 2A is a schematic of an example segmentation model having an ancillary model for generating high-detail predictions based on low-detail input.

FIG. 2A shows schematically an example semantic segmentation model 200a. Either or both of two datasets may be available: a fully-supervised dataset 202 having items 206 and corresponding high-detail segmentation masks 216 and a weakly-supervised dataset 204 having items 208 and corresponding low-detail segmentation masks 218. Where items 206, 208 are images, high-detail segmentation masks 216 may comprise polygonal masks of class instances (e.g. people and planes, as shown in the exemplary FIG. 2) and low-detail segmentation masks 218 may comprise bounding boxes which relatively coarsely correspond to class instances. (The particular example shown in FIG. 2 has a first bounding box containing the area in which a person is found and a second bounding box containing the area in which a horse is found—although the bounding boxes also contain substantial areas which do not contain people or horses due to their low detail.)

Primary model 232 receives items 206 and/or 208 as input and outputs predictions 240. It is possible to train primary model 232 in a fully-supervised regime by ingesting items 206, generating predictions 240 (e.g. by processing items 206 via a convolutional neural network or other suitable machine learning models), and updating parameters via training module 238 based on ground-truth segmentation masks 216 (e.g. by optimizing a cross-entropy loss term over the parameters of primary model 232), as described above. Primary model may comprise, for example, an encoder-decoder-based deep network (such as, e.g., a DeepLabv3+ model), although other segmentation models may be used instead or in addition. Primary model 232 can be represented as a distribution p defined over the space of all possible predictions 240 conditioned on its inputs and its parameters $\phi$). This can be written in terms of pointwise probabilities as $p(y|x,\phi)$, where y is a prediction for a given input x.

Ancillary model 234 receives items 206, 208 as input, along with corresponding low-detail segmentation masks 218 (which, in the case of items 206, may be generated from high-detail segmentation masks 216 and/or otherwise obtained), and outputs a high-detail segmentation mask 226. High-detail segmentation masks 226 can be used to assist in training of primary model 232. In at least some implementations, ancillary model 234 and its generated high-detail segmentation masks 226 are not required during inference, allowing primary model 232 to be used for inference according to conventional (or any other suitable) techniques. Ancillary model 234 can be represented as a distribution $p_{anc}$ defined over the space of all possible predictions conditioned on its inputs (items 208 and low-detail segmentation masks 204) and its parameters θ, which may be disjoint from or fully or partially shared with primary model 232.

Figure 3:
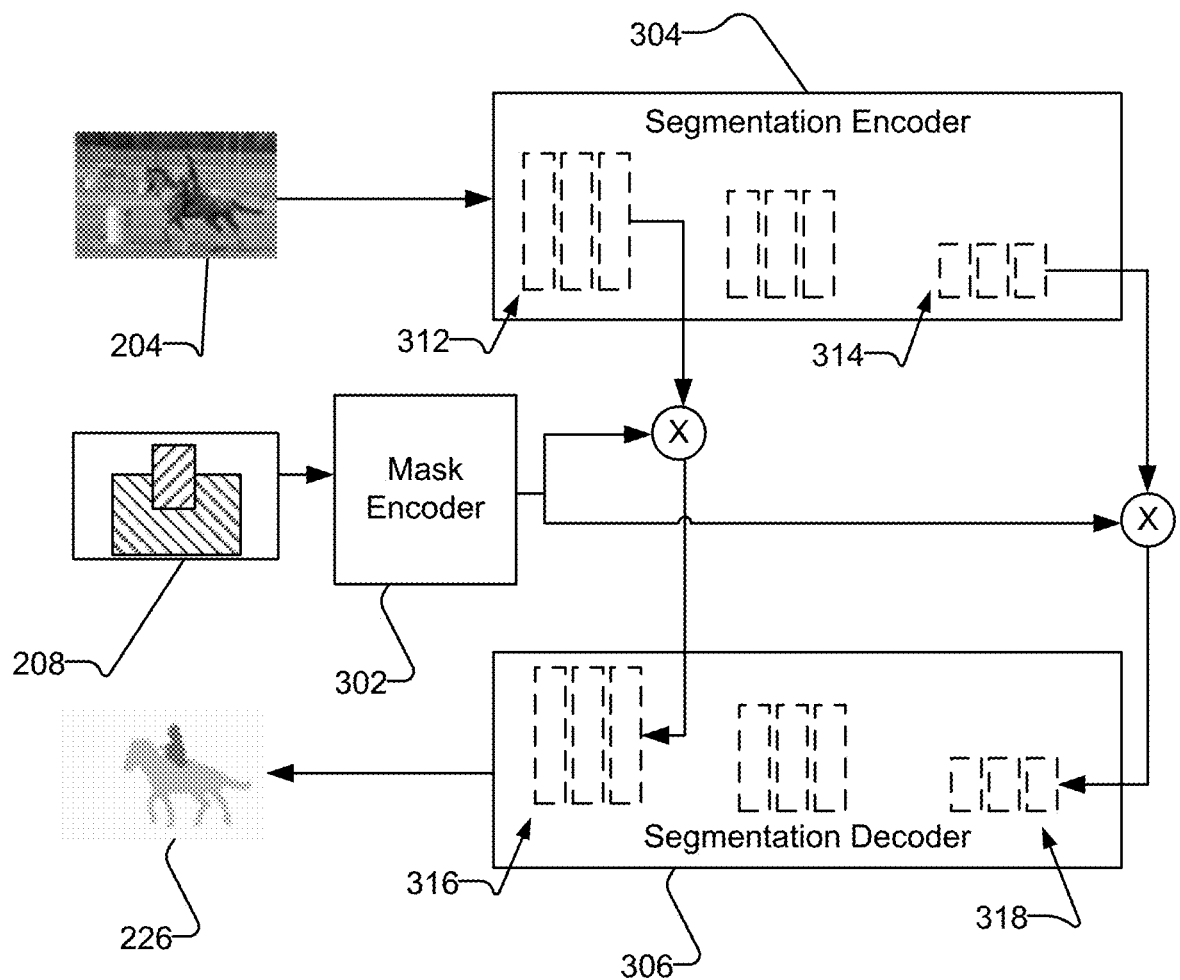
FIG. 3 is a schematic of an example implementation of the ancillary model of FIG. 2A.

In some implementations, ancillary model 234 comprises an encoder-decoder segmentation model (which may, e.g., correspond structurally to primary model 232) with an additional mask encoder to assist in processing low-detail segmentation masks 208. FIG. 3 shows an example mask encoder 302. The example ancillary model of FIG. 3 comprises a segmentation encoder 304 and segmentation decoder 306. Encoder 304 and decoder 306 may provide layers which produce representations of varying size, such as high-detail layers 312 and 318 and low-detail layers 314 and 316. Information may flow some or all of the layers of encoder 304 before being passed to decoder 306. For example, information may be passed from high-detail layers 312 to low-detail layers 314 in encoder 304 (thus downsampling input item 204) before being passed to decoder 306. Decoder 306 may then pass that information from low-detail layers 316 to high-detail layers 318 (thus upsampling the output of encoder 304) to produce output segmentation mask 226. Alternatively, or in addition, information may be passed between layers of similar size even if not fully processed by the encoder—for example, high-detail layers 312 of encoder 304 may pass information to high-detail layers 316 of decoder 306.

Mask encoder 302 processes input low-detail segmentation mask 208 to one or more intermediate forms which may be combined with the output of encoder 304. The result(s) of that combination are decoded by decoder 306. Where encoder 304 produces multiple forms of output (e.g. high-detail output at layers 312 and low-detail output at layers 314), mask encoder 302 may produce corresponding representations for one or more of those forms of output, e.g. by resizing its output to correspond to the size of encoder 304's output. The output of mask encoder 302 and 304 may be combined in any suitable way, e.g. via elementwise multiplication.

In some implementations, mask encoder 302 is parametrized via a subset of the ancillary model's parameters θ. Encoder 302 may process an input low-detail segmentation mask 208 based on those parameters, e.g. by passing it through a convolution layer with sigmoid activation or via other suitable techniques. Mask encoder 302 may generate, for example, an attention map based on input low-detail segmentation mask 208.

Returning to FIG. 2A, ancillary model 234 may be trained independently of primary model 232 based on a corresponding objective function (which may differ from an objective function used to train primary model 232). For example, ancillary model 234 may be trained by training module 238 based on a cross-entropy loss using fully-supervised dataset 202, e.g. based on:

$$\max_{\theta} \sum_{(x,y) \in \mathcal{F}} \log p_{anc}(y \mid x, b, \theta)$$

where $\mathcal{F}$ denotes fully-supervised dataset 202, each (x, y) pair denotes an item (x) and its corresponding high-detail segmentation mask (y), and b denotes the low-detail segmentation masks received by ancillary model 234. Low-detail segmentation masks may be obtained by, for example, generating them from the high-detail segmentation masks 216 already in $\mathcal{F}$. This may involve, for example, determining the appropriately-shaped (e.g. rectangular) closure of each mask layer to generate a corresponding bounding box.

Ancillary model 234 is used by training module 238 to assist in training primary model 232. In some implementations, the parameters of ancillary model 234 are fixed while training primary model 232. Primary model 232 may be trained over either or both datasets 202 and 204. In some implementations, primary model 232 is trained over both datasets 202 and 204 in minibatches, with items from each dataset 202 and 204 present in each minibatch. Primary model 238 may be trained by optimizing an objective function based on a fully-supervised objective term defined over high-detail dataset 202 ($\mathcal{F}$) and a weakly-supervised objective term defined over low-detail dataset 204 (W). In some implementations, the weakly-supervised objective term has a form corresponding to that of the fully-supervised objective term with a further scaling term based on the predictions 226 of ancillary model 234.

For example, the objective function may be determined based on:

$$\max_{\phi} \sum_{(x,y) \in \mathcal{F}} \log p(y \mid x, \phi) + \sum_{(x,y,b) \in W} \sum_{y} p_{anc}(y \mid x, b, \theta) \log p(y \mid x, \phi)$$

where the first term is a conventional cross-entropy term (and serves as the fully-supervised term defined over $\mathcal{F}$) and the second term is a cross-entropy term scaled by a probabilistic label generated by ancillary model 234 (i.e. $p_{anc}(y|x,b,\theta)$). Note that in this example formulation θ (the parameters of ancillary model 234) are fixed. Scaling the contribution of the output of primary model 232 over weakly-supervised dataset 204 based on predictions 226 of ancillary model 234 over the same items tends to draw primary model 232's behavior toward the output of ancillary model 234, thereby allowing primary model 238 to be trained over W despite the lack of ground-truth, high-detail segmentation masks 216 in weakly-supervised dataset 204.

In some implementations, the contribution of the weakly-supervised term is scaled to adjust the degree to which primary model 232 relies on weakly-supervised dataset 204 in training. For example, the second term may be multiplied by a scaling factor α; setting α<1 will tend to reduce the effect of weakly-supervised dataset 204 (and this prioritize fully-supervised dataset 202).

Figure 5A:
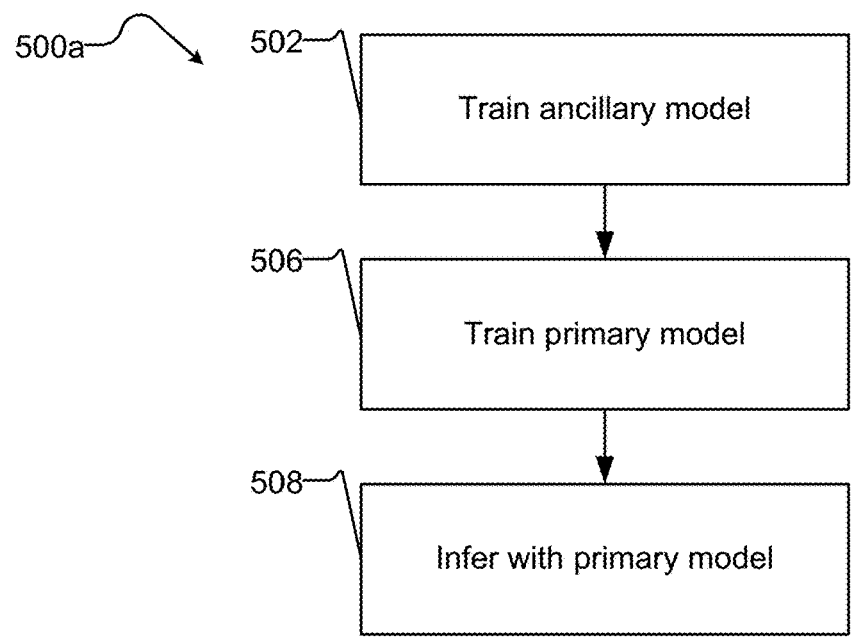
FIG. 5A is a flowchart of an example method for training the example segmentation model of FIG. 2A (and some implementations of the example segmentation model of FIG. 2B).

FIG. 5A shows schematically a flowchart of example method 500a for training model 200a. At 502 ancillary model 234 is trained over all or part of fully-supervised dataset 202. In at least some implementations, this is done independently of training primary model 232. At 506 primary model 232 is trained over both the fully- and weakly-supervised datasets 202, 204 (or portions thereof) based on ancillary model 234's predictions, as described above. At 508 primary model 506 may be used for inference (this is technically a post-training step but is shown to assist the reader). As noted above, in at least some implementations ancillary model 234 is not required for inference.

Semantic Segmentation with Self-Correction

The foregoing example model 200a has been found experimentally to yield promising results in at least some circumstances where ancillary model 234 is trained exclusively on fully-supervised data $\mathcal{F}$ and its output is used directly to influence the training of primary model 232 over weakly-supervised data W. In some implementations, the output of primary model 232 (trained over $\mathcal{F}$ and W) is mixed with the output of ancillary model 234 (trained over $\mathcal{F}$) by a self-correction module 236 to generate a prediction 226 which is based not only on learning from $\mathcal{F}$ but also from W.

Figure 2B:
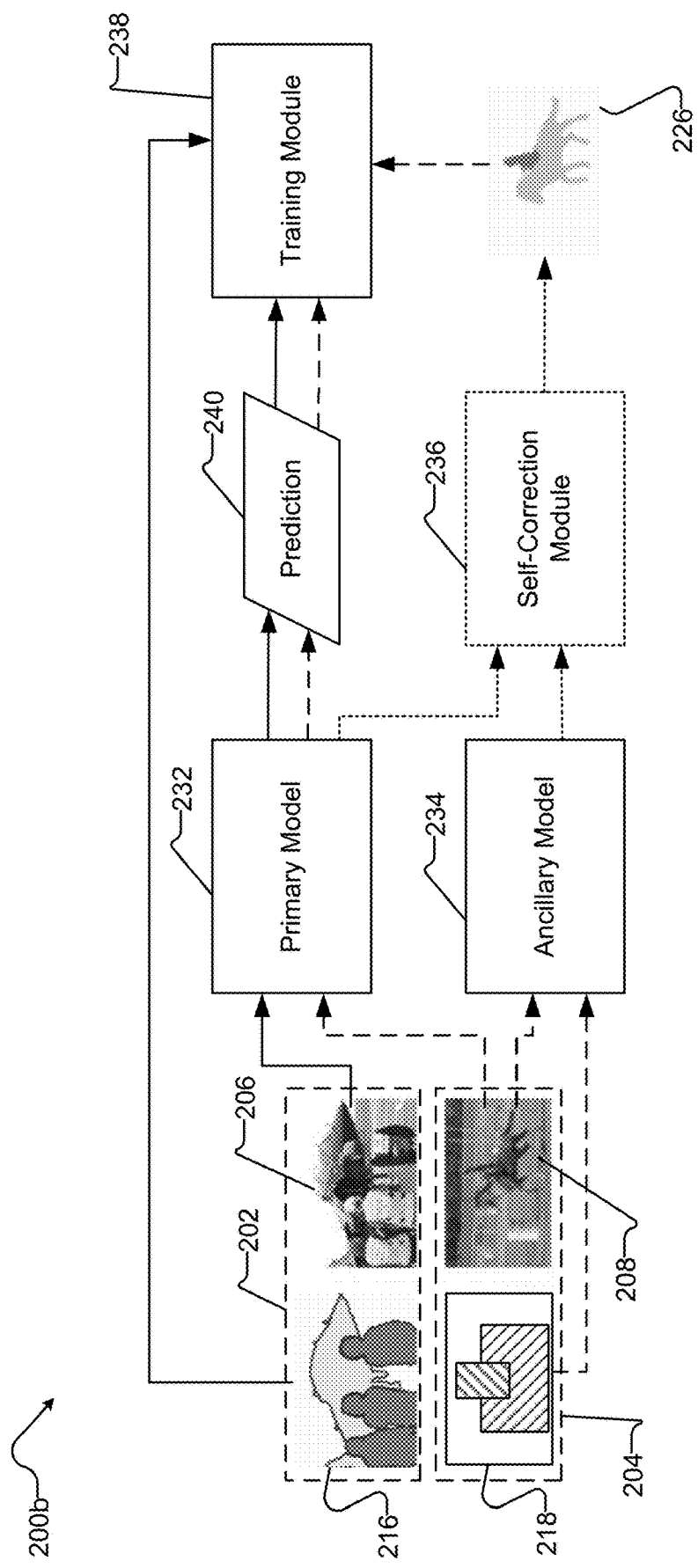
FIG. 2B is a schematic of the example segmentation model of FIG. 2A adapted to include a self-correction module.

FIG. 2B shows an example model 200b having an example self-correction module 236. It receives output from both primary model 232 and ancillary model 234 and mixes them to generate prediction 226. For example, self-correction module may induce a distribution q(y|x,b) over labels that tends to be close to both distributions p(y|x,φ) and $p_{anc}$(y|x,b,θ) of the primary and ancillary models 232 and 234, respectively. Distribution q may have its own parameters λ or be parameter-free (other than, optionally, an implicit parametrization by φ and/or θ due to dependence on models 232, 234). Self-correction module 236 may come in any of several forms, including linear, convolutional, and/or otherwise.

In some implementations, self-correction module 236 comprises a linear combination of the output of primary and ancillary models 232 and 234. Such a linear combination may be parameter-free. For example, training module 238 may recast training primary model 232 as training the distribution q of the self-correction module 236. (It is equivalent to think of this as training primary model 232 based on an objective function which includes a transformation of its output induced by q—in either event, training of primary model 232 by training module 238 is based on q.) For instance, training module 238 may train primary model 232 based on a KL-divergence between q and p and also on a KL-divergence between q and $p_{anc}$, e.g. as follows:

$$\min_q KL(q(y|x,b)\|p(y|x)) + \alpha KL(q(y|x,b)\|p_{anc}(y|x,b))$$

where α is a scaling term and parameters φ, θ, and λ (if used) are omitted for convenience. Scaling term α is optional; in some implementations α starts at a large value early in training (when primary model 232 is mostly untrained and so tends to contribute mostly noise) and falls to a smaller value over the course of training (e.g. stepwise, by annealing, or otherwise). For example, α might fall from 30 to 0.5 over the course of training.

In some implementations, distribution q is determined based on a mean of the primary and ancillary models' 232, 234 distributions p, $p_{anc}$. For example, q may comprise an arithmetic and/or geometric mean. For instance, q may be determined based on:

$$q(y|x,b) \propto (p(y|x)p_{anc}^\alpha(y|x,b))^{\frac{1}{\alpha+1}}$$

In some implementations, such as those where $p_{anc}$(y|x,b) and p(y|x) are both factorial (e.g. where they decompose to the product of probabilities over the components of y) and distributions over components are categorical, q is factorial and may be determined by (for example) applying a softmax activation to the linear combination of logits coming from primary and ancillary models 232, 234. For example, q may be determined based on:

$$q(y_m = 1|x, b) = \sigma\left(\frac{l_m + \alpha l_m^{anc}}{\alpha + 1}\right)$$

where σ is the softmax function, $l_m$:=log p($y_m$=1|x) and $l_m^{anc}$:=log $p_{anc}$($y_m$=1|x,b) are logits generated by the primary and ancillary models 232, 234 respectively, and $y_m$ denotes the $m^{th}$ element of item y (e.g. the $m^{th}$ pixel). Distribution q may be determined in other suitable ways depending on the structure of the underlying distributions p and $p_{anc}$, the structure chosen for q (e.g. the form of mean selected), and/or other factors.

Training module 238 may train primary model 232 based on distribution q of self-correction module 236 by, for example, using q in place of $p_{anc}$. Referring back to an earlier example, a resulting example objective function may be based on:

$$\max_\phi \sum_{(x,y)\in\mathcal{F}} \log p(y|x,\phi) + \sum_{(x,y,b)\in W} \sum_y q(y|x,b)\log p(y|x,\phi)$$

where q may optionally be further parametrized by α and/or other parameters as described elsewhere herein. Such implementations may, where suitable, be trained according to example method 500a.

Figure 4:
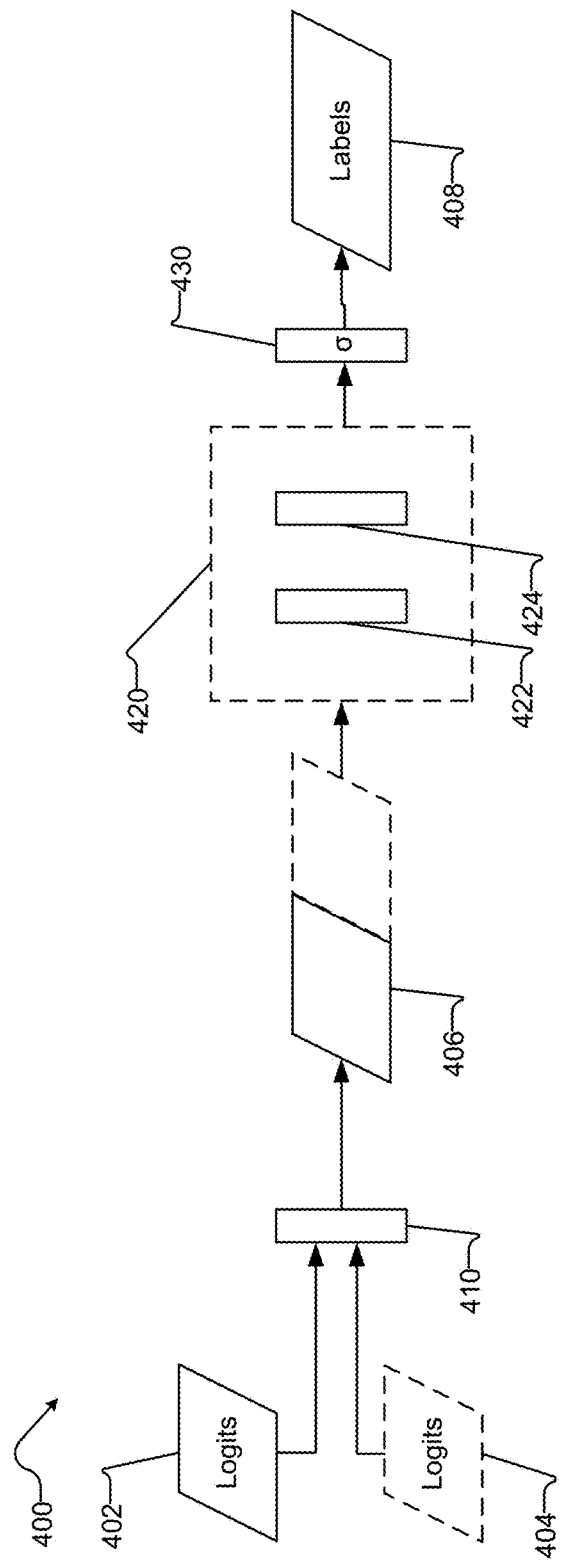
FIG. 4 is a schematic of an example implementation of the self-correction module of FIG. 2B.

In some implementations, self-correction module 236 comprises a neural network, such as a convolutional neural network, to learn q. This alleviates the need to select a suitable range of α values (in implementations where α is required), which may require a hyperparameter search. The network may be large, but this is not required; in some implementations, the network of self-correction module 236 is relatively small, such as the example network 400 of FIG. 4.

Network 400 receives logits 402 from primary model 232 and logits 404 from ancillary model 234. It combines these inputs at combiner 410, e.g. via concatenation, to generate combined logits 406. Combined logits 406 are then processed by convolutional layers 420. There may be any number of these; in at least one embodiment, it comprises two convolution layers 422, 424 each comprising a 3×3 kernel and a ReLU activation function. (Activation functions are not required and kernels may vary in size—e.g. a 1×1 kernel may be used.) In some embodiments, layer 424 has a number of output feature maps corresponding to the number of classes in the dataset and layer 422 has a fixed number (e.g. 128) which may differ from that of layer 424. Prediction 408 is obtained based on the output of layers 420; e.g. that output may be used directly as prediction 408, and/or it may optionally be received at a sigmoid module and processed to generate prediction 408.

Self-correction module 236 is parametrized in such embodiments by parameters λ (which may comprise, e.g., the parameters of network 400). This network may be trained independently of primary model 232 and/or alongside primary model 232. In some implementations, self-correction module 236 is trained alongside primary model 232 by using q in place of ancillary model 234's $p_{anc}$ in the objective function and by adding a term to train parameters λ over fully-supervised dataset 202. For example, training module 238 may train model 200b by optimizing an objective function based on:

$$\max_{\phi} \sum_{(x,y)\in\mathcal{F}} \log p(y\mid x,\phi) + \sum_{(x,y,b)\in\mathcal{W}} \sum_{y} q(y\mid x,b,\lambda)\log p(y\mid x,\phi) + \sum_{(x,y)\in\mathcal{F}} \log q(y\mid x,b,\lambda)$$

where the first and second terms train primary model 232 on $\mathcal{F}$ and W, respectively, and the last trains the network of self-correction module 236 on $\mathcal{F}$. In some implementations, q is not backpropagated through the second term; i.e. q is held fixed over W but not $\mathcal{F}$.

In some implementations the parameters of self-correction module 236 are randomly initialized. As a result, it may be inaccurate early in training when predicting labels for items in W. In some such implementations, ancillary model 234 is trained over a subset of items $\mathcal{P}$ in fully-supervised dataset 202, with the remaining items being retained for later training. Self-correction module 236 is then pre-trained over fully-supervised dataset 202, including items not in $\mathcal{P}$ (e.g. module 236 may be trained over all of $\mathcal{F}$). This pre-training may be done via the first and last terms of the above objective function, i.e. omitting the terms over W. In some implementations, both $\phi$ (the parameters of primary model 232) and $\lambda$ are pre-trained at this stage. The final (or main) stage of training may then proceed over all training data (i.e. all of $\mathcal{F}$ and W) using all terms of the objective function; this "fine-tunes" the whole model.

Figure 5B:
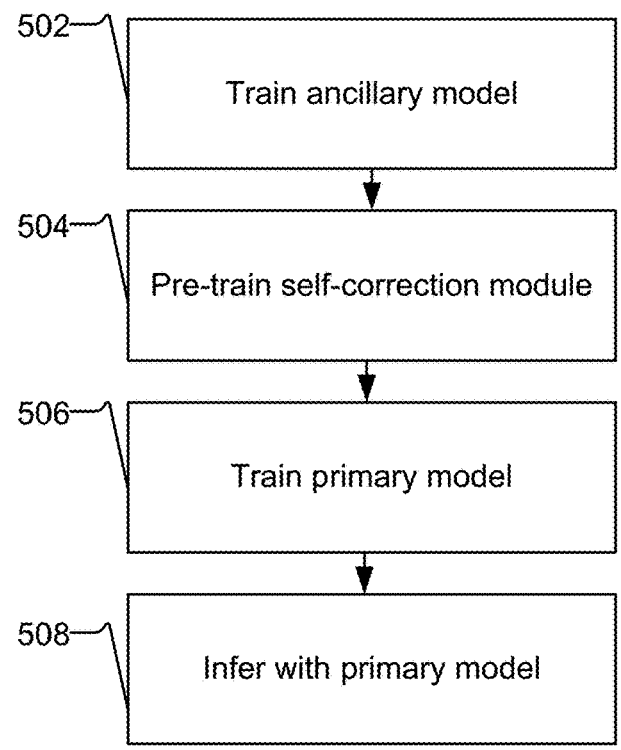
FIG. 5B is a flowchart of an example method for training certain implementations of the example segmentation model of FIG. 2B.

FIG. 5B shows schematically a flowchart of example method 500b for training model 200b for implementations where self-correction module 234 is provided and pre-training is used. At 502 ancillary model 234 is trained over a portion ($\mathcal{P}$) of fully-supervised dataset 202. In at least some implementations, this is done independently of training primary model 232. At 504 self-correction module 236 is pre-trained as described above. This pre-training may be independent of any weakly-supervised data so at to limit interaction between parameters. At 506 primary model 232 is trained over both the fully- and weakly-supervised datasets 202, 204 (or portions thereof) based on ancillary model 234's predictions, as corrected by self-correction module 234, as described above. At 508 primary model 506 may be used for inference. As noted above, in at least some implementations ancillary model 234 and self-correction module 236 are not required for inference.

Implementations of example model 200b have been tested on certain widely-available datasets and have achieved results which exceed that of the state of the art, indicating that in at least some circumstances the presently-disclosed systems and methods provide a machine learning model which is more powerful and/or relies less heavily on costly fully-supervised data than at least some existing techniques.

Concluding Generalities

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. The teachings provided herein of the various implementations can be applied to other methods of quantum computation, not necessarily the exemplary methods for quantum computation generally described above.

The various implementations described above can be combined to provide further implementations. All of the commonly assigned US patent application publications, US patent applications, foreign patents, and foreign patent applications referred to in this specification and/or listed in the Application Data Sheet, including but not limited to U.S. Provisional Application No. 62/768,020, are incorporated herein by reference, in their entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for instantiating a machine learning system for generating semantic segmentation masks over an input dataset based on a fully-supervised dataset having high-detail labels and a weakly-supervised dataset having low-detail labels, the method executed by at least one processor in communication with at least one memory and comprising:
   instantiating a primary model in the at least one memory, the primary model operable to generate a high-detail prediction based on one or more parameters of the primary model and a first item from any of the input, fully-supervised, and weakly-supervised datasets;
   instantiating an ancillary model in the at least one memory, the ancillary model operable to generate a high-detail prediction based on one or more parameters of the ancillary model, a second item, and a low-detail label corresponding to the second item;
   training the one or more parameters of the ancillary model based on the fully-supervised dataset independently of the primary model;
   training the one or more parameters of the primary model based on the fully-supervised and weakly-supervised datasets based on one or more predictions of the ancillary model over the weakly-supervised dataset.

2. The method according to claim 1 wherein training the one or more parameters of the primary model comprises holding the one or more parameters of the ancillary model fixed while training the primary model.

3. The method according to claim 1 wherein instantiating the ancillary model comprises instantiating an encoder-decoder segmentation model comprising an encoder and a decoder and instantiating the ancillary model further comprises instantiating a mask encoder operable to transform the low-detail label into one or more representations corresponding to output of the encoder.

4. The method according to claim 3 wherein training the one or more parameters of the ancillary model comprises combining the one or more representations of the low-detail label with one or more encoded values output by the encoder to generate a combined representation and passing the combined representation to the decoder in place of the one or more encoded values.

5. The method according to claim 1 wherein training the one or more parameters of the primary model comprises determining a value of an objective function based on a first probability of a first label being generated by the primary model and further based on a second probability of the first label being generated by the ancillary model.

6. The method according to claim 5 wherein determining the value of the objective function based on the second probability comprises scaling a first term based on the first probability by a second term based on the second probability.

7. The method according to claim 1 further comprising instantiating a self-correction module in the at least one memory, the self-correction module operable to generate a high-detail prediction based on a first prediction of the primary model and a second prediction of the ancillary model.

8. The method according to claim 7 wherein the self-correction module is operable to generate the high-detail prediction based on a linear combination of a first distribution induced by the primary model and a second distribution induced by the ancillary model and training the one or more parameters of the primary model comprises optimizing an objective function based on the linear combination of the first and second distributions.

9. The method according to claim 8 wherein the linear combination comprises a geometric mean of the first and second distributions and training the one or more parameters of the primary model comprises optimizing an objective function based on the geometric mean of the first and second distributions.

10. The method according to claim 9 wherein training the one or more parameters of the primary model comprises determining a value of an objective function based on a first probability of a first label being generated by the primary model and further based on a second probability of the first label being generated by the ancillary model.

11. The method according to claim 10 wherein determining the value of the objective function based on the second probability comprises scaling a first term based on the first probability by a second term based on the second probability.

12. The method according to claim 10 wherein determining a value of an objective function based on the second probability comprises determining the second term based on the second probability of the first label being generated by the self-correction module.

13. The method according to claim 7 wherein the self-correction module is operable to generate the high-detail prediction based on a neural network having one or more parameters, the neural network operable to receive a first prediction of the primary model and a second prediction of the ancillary model as input, the method further comprising training the one or more parameters of the self-correction module based on the fully-supervised dataset.

14. The method according to claim 13 wherein:
training the one or more parameters of the ancillary model comprises training the one or more parameters of the ancillary model over a first subset of the fully-supervised dataset; and
training the one or more parameters of the self-correction module comprises pre-training the one or more parameters of the self-correction module over a second subset of the fully-supervised dataset containing one or more items not in the first subset, said pre-training done independently of the weakly-supervised dataset.

15. The method according to claim 14 wherein training the one or more parameters of each of the self-correction module and primary model comprises training the self-correction module and primary model together over at least a portion of the fully-supervised dataset and at least a portion of the weakly-supervised dataset after pre-training the self-correction module.

16. A computing system comprising:
at least one processor;
at least one nontransitory processor-readable medium communicatively coupled to the at least one processor, the at least one nontransitory processor-readable medium which stores at least one of processor-executable instructions or data which, when executed by the at least one processor, cause the at least one processor to:
instantiate a primary model in the at least one memory, the primary model operable to generate a high-detail prediction based on one or more parameters of the primary model and a first item from any of the input, fully-supervised, and weakly-supervised datasets;
instantiate an ancillary model in the at least one memory, the ancillary model operable to generate a high-detail prediction based on one or more parameters of the ancillary model, a second item, and a low-detail label corresponding to the second item;
train the one or more parameters of the ancillary model based on the fully-supervised dataset independently of the primary model;
train the one or more parameters of the primary model based on the fully-supervised and weakly-supervised datasets based on one or more predictions of the ancillary model over the weakly-supervised dataset.

17. The computing system according to claim 16 wherein the at least one processor, when caused to execute the at least one of processor-executable instructions or data, is further caused to instantiate a self-correction module in the at least one memory, the self-correction module operable to generate a high-detail prediction based on a first prediction of the primary model and a second prediction of the ancillary model.

18. The computing system according to claim 17 wherein the self-correction module is operable to generate the high-detail prediction based on a neural network having one or more parameters, the neural network operable to receive a first prediction of the primary model and a second prediction of the ancillary model as input, wherein the at least one processor, when caused to execute the at least one of processor-executable instructions or data, is further caused to train the one or more parameters of the self-correction module based on the fully-supervised dataset.

19. The computing system according to claim 18 wherein the at least one processor, when caused to execute the at least one of processor-executable instructions or data, is caused to:
  train the one or more parameters of the ancillary model over a first subset of the fully-supervised dataset when training the one or more parameters of the ancillary model comprises causing; and
  pre-train the one or more parameters of the self-correction module over a second subset of the fully-supervised dataset containing one or more items not in the first subset, said pre-training done independently of the weakly-supervised dataset, when training the one or more parameters of the self-correction module.

20. The computing system according to claim 19 wherein the at least one processor, when caused to execute the at least one of processor-executable instructions or data, is caused to train the self-correction module and primary model together over at least a portion of the fully-supervised dataset and at least a portion of the weakly-supervised dataset after pre-training the self-correction module when training the one or more parameters of each of the self-correction module and primary model.

* * * * *